United States Patent
Shinkawa

(10) Patent No.: US 12,461,360 B2
(45) Date of Patent: Nov. 4, 2025

(54) MOVABLE DEVICE, PROJECTION APPARATUS, AND HEAD-UP DISPLAY

(71) Applicant: Mizuki Shinkawa, Kanagawa (JP)

(72) Inventor: Mizuki Shinkawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 376 days.

(21) Appl. No.: 18/122,152

(22) Filed: Mar. 16, 2023

(65) Prior Publication Data

US 2023/0324677 A1 Oct. 12, 2023

(30) Foreign Application Priority Data

Mar. 18, 2022 (JP) .................................. 2022-044528
Dec. 19, 2022 (JP) .................................. 2022-201909

(51) Int. Cl.
*G02B 26/10* (2006.01)
*G02B 7/182* (2021.01)
*G02B 27/01* (2006.01)

(52) U.S. Cl.
CPC ......... *G02B 26/101* (2013.01); *G02B 7/1821* (2013.01); *G02B 27/0176* (2013.01)

(58) Field of Classification Search
CPC . G02B 26/101; G02B 7/1821; G02B 27/0176
See application file for complete search history.

(56) References Cited

U.S. PATENT DOCUMENTS

| 2016/0068106 | A1* | 3/2016 | Brouwer ............. G02B 7/1821 248/479 |
| 2018/0282147 | A1 | 10/2018 | Shinkawa et al. |
| 2019/0391394 | A1 | 12/2019 | Shinkawa et al. |
| 2021/0041687 | A1 | 2/2021 | Yokota et al. |
| 2021/0157129 | A1 | 5/2021 | Yoda et al. |
| 2021/0286167 | A1 | 9/2021 | Shinkawa |
| 2022/0299757 | A1 | 9/2022 | Shinkawa et al. |
| 2022/0326512 | A1 | 10/2022 | Shinkawa |

FOREIGN PATENT DOCUMENTS

| JP | 2002-323669 | 11/2002 |
| JP | 2021-067722 | 4/2021 |
| JP | 2021-148835 | 9/2021 |
| JP | 2021-148836 | 9/2021 |

* cited by examiner

*Primary Examiner* — Matthew Mikels
(74) *Attorney, Agent, or Firm* — XSENSUS LLP

(57) ABSTRACT

A movable device includes: a movable portion; a support body; a first member having one end coupled to the support body and another end coupled to the movable portion; the first member including a first driver; and a second member having one end coupled to the support body and another end coupled to the movable portion, the second member including a second driver. The movable portion rotates about a first rotation axis by driving the first driver and without driving the second driver. The movable portion rotates about a second rotation axis by driving the second driver and without driving the first driver. The first rotation axis intersects the second rotation axis.

18 Claims, 33 Drawing Sheets

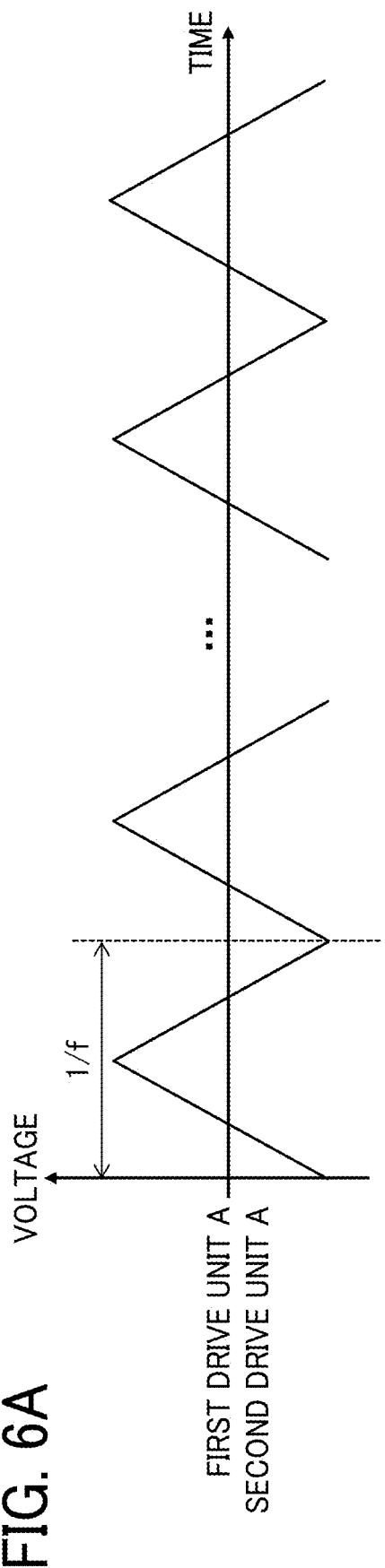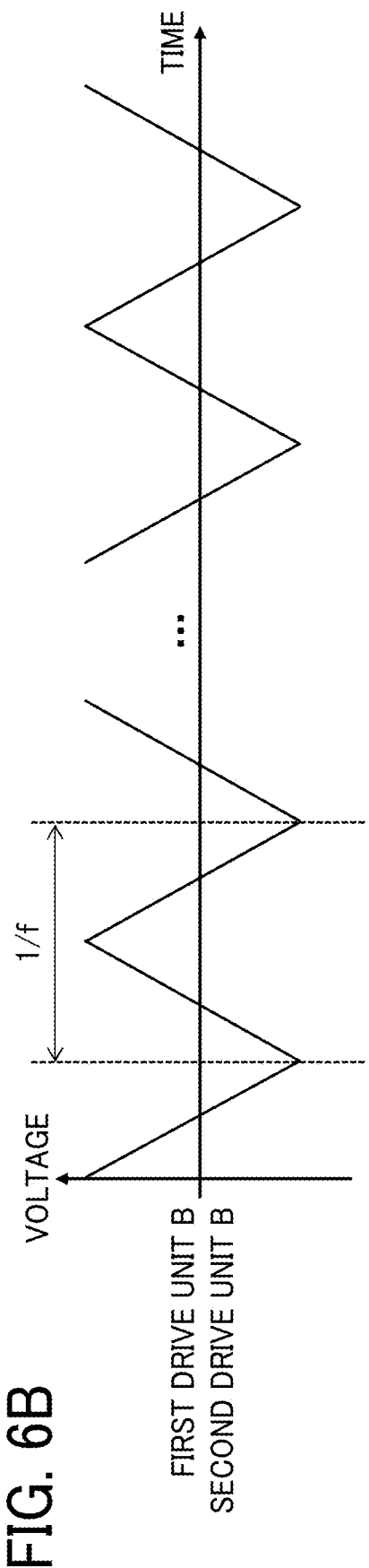

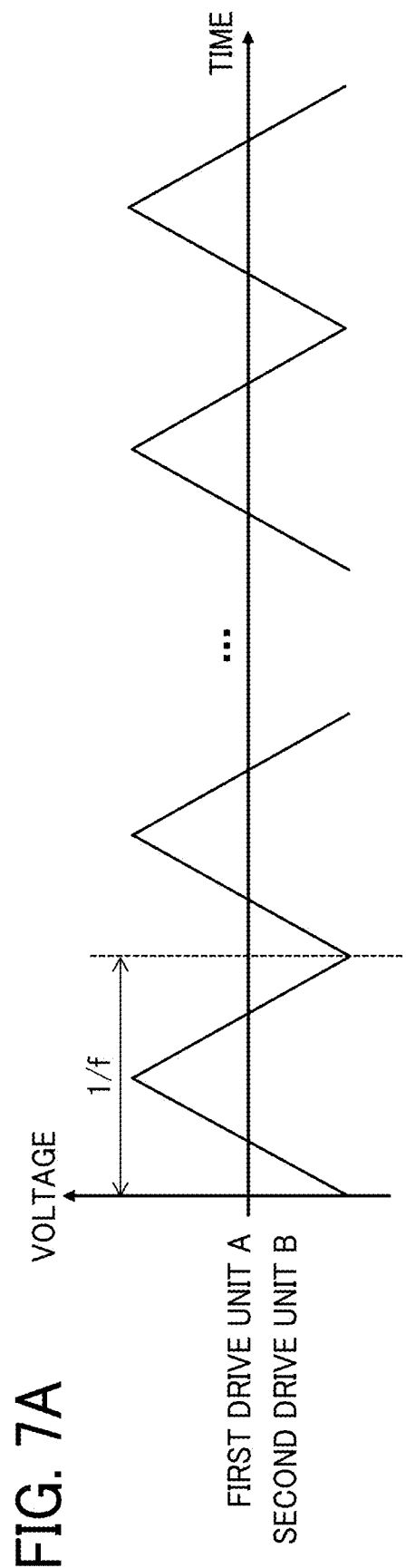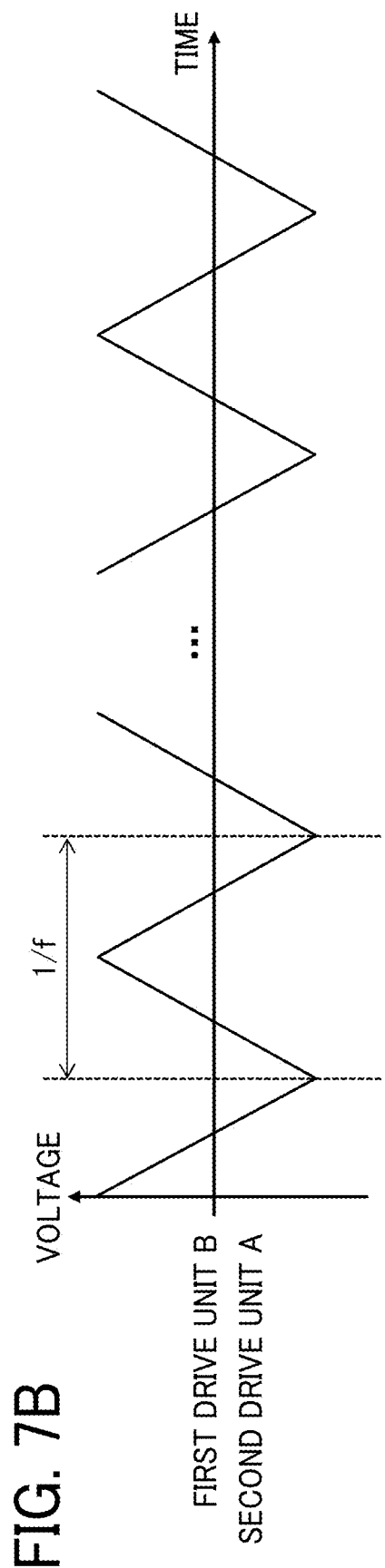

FIG. 21A

| DIRECTION OF DEFLECTION ANGLE | DRIVE UNIT FOR DRIVING | APPLIED VOLTAGE |
|---|---|---|
| 0 DEGREE | ALL THE DRIVE UNITS ARE CONSTANT | REFERENCE VOLTAGE |
| +X DIRECTION | FIRST AND SECOND DRIVE UNITS A | V |
| +X+Y DIRECTION | SECOND DRIVE UNIT A | 2V |
| +X-Y DIRECTION | FIRST DRIVE UNIT A | 2V |
| +Y DIRECTION | FIRST DRIVE UNIT B SECOND DRIVE UNIT A | V |
| -Y DIRECTION | FIRST DRIVE UNIT A SECOND DRIVE UNIT B | V |
| -X+Y DIRECTION | FIRST DRIVE UNIT B | 2V |
| -X DIRECTION | FIRST AND SECOND DRIVE UNITS B | V |
| -X-Y DIRECTION | SECOND DRIVE UNIT B | 2V |

MOVABLE DEVICE, PROJECTION APPARATUS, AND HEAD-UP DISPLAY

CROSS-REFERENCE TO RELATED APPLICATIONS

This patent application is based on and claims priority pursuant to 35 U.S.C. § 119(a) to Japanese Patent Application No. 2022-044528, filed on Mar. 18, 2022, and Japanese Patent Application No. 2022-201909, filed on Dec. 19, 2022, in the Japan Patent Office, the entire disclosure of which is hereby incorporated by reference herein.

BACKGROUND

Technical Field

Embodiments of the present disclosure relate to a movable device, a projection apparatus, and a head-up display (HUD).

Related Art

An optical deflector capable of two-dimensional deflection in an oscillator device such as an optical deflector is known.

SUMMARY

An embodiment of the present disclosure provides a movable device includes: a movable portion; a support body; a first member having one end coupled to the support body and another end coupled to the movable portion; the first member including a first driver; and a second member having one end coupled to the support body and another end coupled to the movable portion, the second member including a second driver. The movable portion rotates about a first rotation axis by driving the first driver and without driving the second driver. The movable portion rotates about a second rotation axis by driving the second driver and without driving the first driver. The first rotation axis intersects the second rotation axis.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 6A and 6B are graphs of voltage applied to rotate a movable portion on a third rotation axis;

FIGS. 7A and 7B are graphs of voltage applied to rotate a movable portion on a fourth rotation axis:

FIGS. 8A, 8B, 8C, and 8D are graphs of voltage applied to

Figure 1:
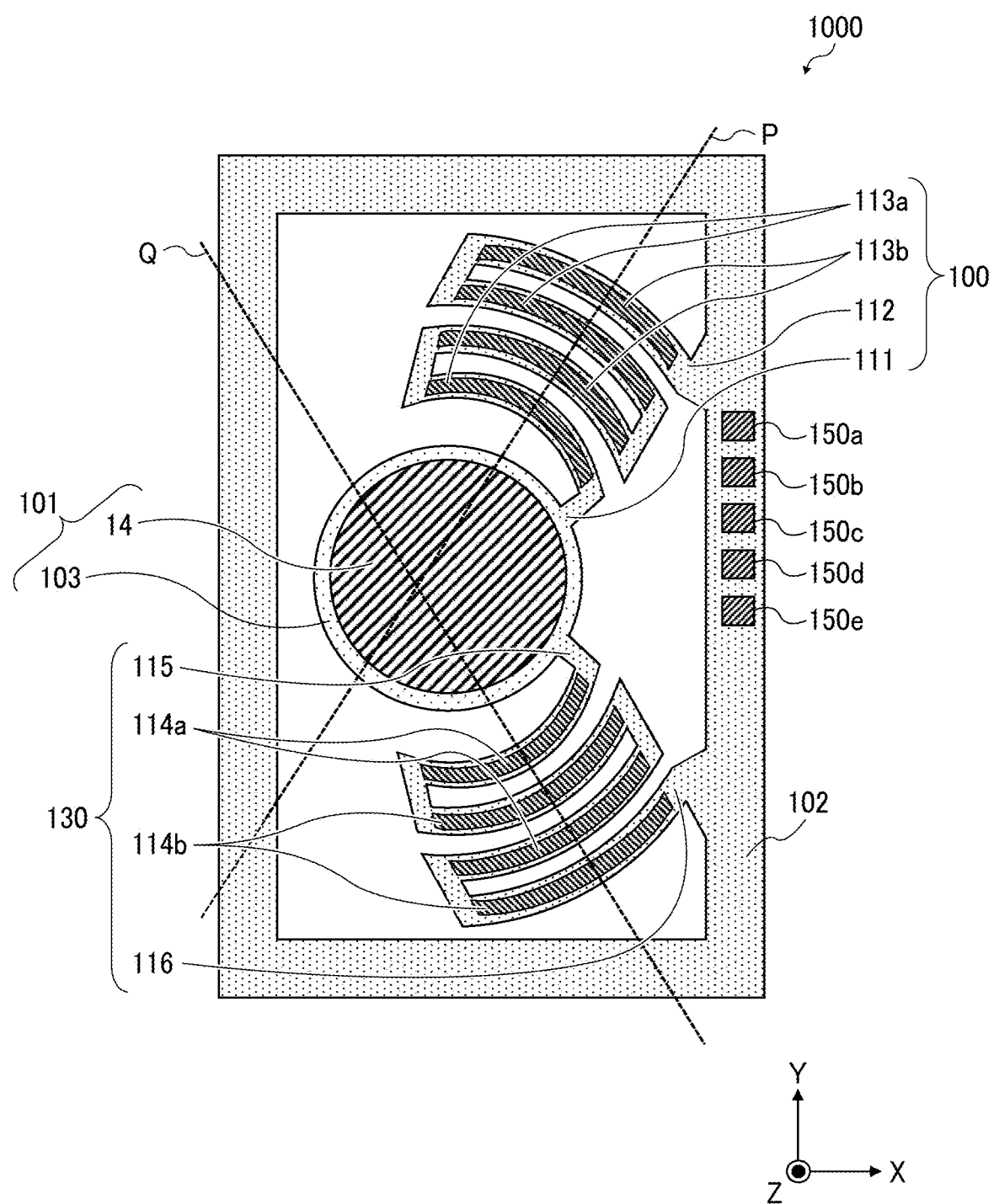
FIG. 1 is a plan view of a configuration of a movable device according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure provide a movable device that is capable of setting the axis of rotation in any desired direction.

Hereinafter, embodiments of the present invention will be described with reference to the drawings. Like reference signs are applied to identical or corresponding components throughout the description of the drawings and redundant description thereof is omitted.

Embodiments

The following descries an embodiment of the present disclosure with reference to FIG. 1. As illustrated in FIG. 1, a movable device 1000 includes a movable portion 101 that reflects incident light, piezoelectric drivers 113a and 113b and piezoelectric drivers 114a and 114b, which are couple to the movable portion 101, a support body 102 supporting a first member 100 including the piezoelectric drivers 113a and 113b and a second member 130 including the piezoelectric drivers 114a and 114b, and electrode connecting portions 150a to 150e that electrically connect the piezoelectric drivers 113a and 113b and the piezoelectric drivers 114a and 114b to a control device.

The movable device 1000 includes one silicon on insulator (SOI) substrate that is formed by any appropriate treatment method, such as etching. On the formed SOI substrate, the reflecting surface 14, the piezoelectric drivers 113a and 113b, the piezoelectric drivers 114a and 114b, and the electrode connecting portions 150a to 150e are formed, which constitutes a single integrated unit of the above-described components. The piezoelectric drivers 113a and 113b define a first drive unit, and the piezoelectric drivers 114a and 114b define a second drive unit. The above-described multiple components may be formed after the SOI substrate is molded, or may be formed while the SOI substrate is being molded.

Figure 2:
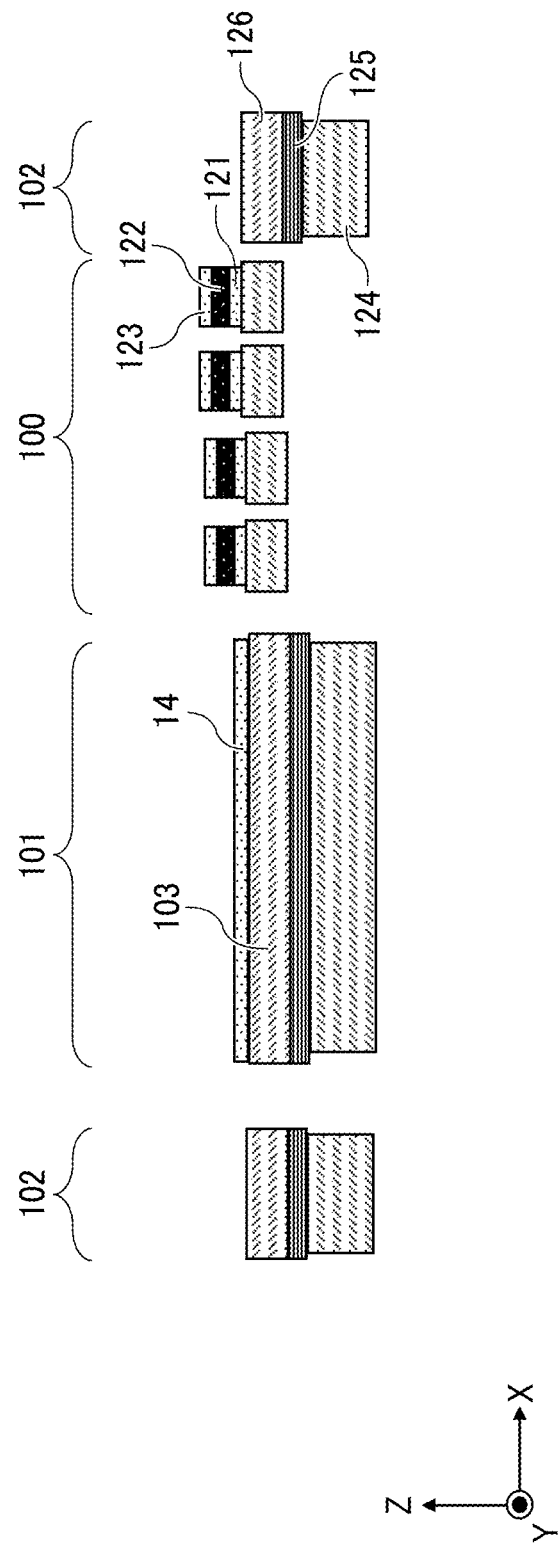
FIG. 2 is a cross-sectional view of the movable device in FIG. 1.

FIG. 2 is a cross-sectional view taken along line P in FIG. 1. The cross section taken along the straight line Q is also substantially the same as the cross section in FIG. 2. The SOI substrate is a substrate in which, on a first silicon layer formed of single crystal silicon (Si), a silicon oxide layer 125 is formed, and on the silicon oxide layer 125, a second silicon layer formed of single crystal silicon is further formed. In the following description, the first silicon layer and the second silicon layer may be referred to as a silicon supporting layer 124 and a silicon active layer 126, respectively.

The silicon active layer 126 has a smaller thickness along the Z-axis than the thickness along the X-axis or the Y-axis. With such a configuration, any member made of the silicon active layer 126 serves as an elastic body having elasticity.

The SOI substrate does not have to be planar, and may have, for example, a curvature. As long as the substrate can be integrally processed by etching or the like and can be partially elastic, the member used for forming the movable device 13 is not limited to the SOI substrate.

The movable portion 101 includes, for example, a circular movable-portion base 103 and the reflecting surface 14 that is formed on the +Z surface of the movable-portion base 103. The movable-portion base 103 is composed of, for example, a silicon active layer 126.

The reflecting surface 14 includes a metal thin film containing, for example, aluminum (Al), gold (Au), or silver (Ag). The movable portion 101 may include a rib for strengthening the movable portion 101, on the −Z-side surface of the movable-portion base 103. Such a rib includes, for example, the silicon support layer 124 and the silicon oxide layer 125, serving to prevent the distortion of the reflecting surface 14 due to the motion.

The first member 100 includes multiple piezoelectric drivers 113a and 113b. The first member 100 has one end coupled to the movable-portion base 103 through a connecting portion 111 and the other end coupled to the inner peripheral portion of the support body 102 through a connecting portion 112.

Similarly, the second member 130 includes multiple piezoelectric drivers 114a and 114b. The second member 130 has one end coupled to the movable-portion base 103 through a connecting portion 115 and the other end coupled to the inner peripheral portion of the support body 102 through a connecting portion 116.

The connecting portion 111 is a first connecting portion, and the connecting portion 115 is a second connecting portion.

The first drive unit includes, for example, multiple piezoelectric drivers 113a and 113b.

Similarly, the second member 130 includes, for example, multiple piezoelectric drivers 114a and 114b. The first member 100, the connecting portions 111 and 112, the second member 130, and the connecting portions 115 and 116 are line-symmetric with respect to a straight line passing through the center of the reflecting surface 14.

The first member 100 and the second member 130 have a meandering structure in which the piezoelectric drivers are joined so as to turn. This allows a larger deflection angle of the movable portion. In addition, such a meandering structure reduces ringing by canceling the oscillation of the piezoelectric drivers 113a, 113b, 114a, and 114b, and enables a higher image quality in the application of an image forming apparatus incorporating the movable device according to an embodiment of the present disclosure.

The first member 100 having the piezoelectric drivers (113a, 113b) (i.e., the first driver) and the second member 130 having the piezoelectric drivers (114a, 114b) (i.e., the second driver) have a meandering structure having a curved shape concentric with the movable portion 101 having a circular shape. This configuration achieves a reduction in size to a chip size and an increase in the amplitude of the movable portion.

As illustrated in FIG. 2, the first member 100 having the piezoelectric drivers (113a, 113b) and the second member 130 having the piezoelectric drivers (114a, 114b) are composed of a silicon active layer 126. The piezoelectric drivers 113a. 113b, 114a, and 114b each include a lower electrode 121, a piezoelectric portion 122, and an upper electrode 123, which are formed in that order on the +Z surface of the silicon active layer 126 that serves as an elastic body.

Each of the upper electrode 123 and the lower electrode 121 is made of, for example, gold (Au) or platinum (Pt). For example, the piezoelectric portion 122 is made of lead zirconate titanate (PZT), which is a piezoelectric material.

Referring back to FIG. 1, the support body 102 is, for example, a rectangular support body including the silicon supporting layer 124, the silicon oxide layer 125, and the silicon active layer 126, surrounding the movable portion 101.

The electrode connecting portions 150a to 150e are, for example, formed on the +Z surface of the support body 102. The electrode connecting portions 150a to 150e are electrically connected to the upper electrode 123 and the lower electrode 121 of each of the piezoelectric drivers 113a, 113b, 114a, and 114b and the control device 11 via electrode wiring of aluminum (Al) or the like. The upper electrode 123 or the lower electrode 121 may be directly connected to the electrode connection portion 150. Alternatively, the upper electrode 203 and the lower electrode 201 may be connected to each other, to be indirectly connected to the electrode connection portion 150.

Although this embodiment has illustrated an example in which the piezoelectric portion 122 is formed on only one surface (+Z-side surface) of the silicon active layer 126 serving as the elastic body, the piezoelectric portion 122 may be formed on another surface (for example, −Z-side surface) of the elastic body, or on both the one surface and the other surface of the elastic body.

Further, an insulating layer composed of the silicon oxide layer may be disposed on at least any one of the +Z-side surfaces of the upper electrode 123 of the piezoelectric drivers 113a and 113b, the +Z-side surfaces of the upper electrode 123 of the piezoelectric drivers 114a and 114b, the +Z-side surfaces of the support body 102.

In this case, electrode wiring is provided on the insulating layer, and the insulating layer is partially removed as an opening or is not formed at a connection spot where the upper electrode 123 or the lower electrode 121 and the electrode wiring are connected, so that the piezoelectric drivers 113a and 113b, the piezoelectric drivers 114a and 114b, and the electrode wiring can be designed with a higher degree of freedom, and furthermore, a short circuit as a result of contact between electrodes can be substantially prevented. The silicon oxide film also has a function as an anti-reflection material.

A method of controlling the drive of the first drive unit and the second drive unit of the movable device 1000 and the rotation axes of the first drive unit and the second drive unit are described below.

The piezoelectric portions 122 of the piezoelectric drivers 113a, 113b, 114a, and 114b, when a positive or negative voltage in the polarization direction is applied thereto, are deformed (for example, expanded or contracted) in proportion to the potential of the applied voltage, and exhibit inverse piezoelectric effect. The piezoelectric drivers 113a, 113b, 114a, and 114b move the movable portion 101 by using the inverse piezoelectric effect.

In this case, the angle defined by the reflecting surface 14 of the movable portion 101 with respect to the XY plane when the reflecting surface 14 is inclined to the +Z direction or −Z direction with respect to the XY plane is referred to as deflection angle. In particular, the +Z direction represents a positive deflection angle and the −Z direction represents a negative deflection angle.

Figure 3:
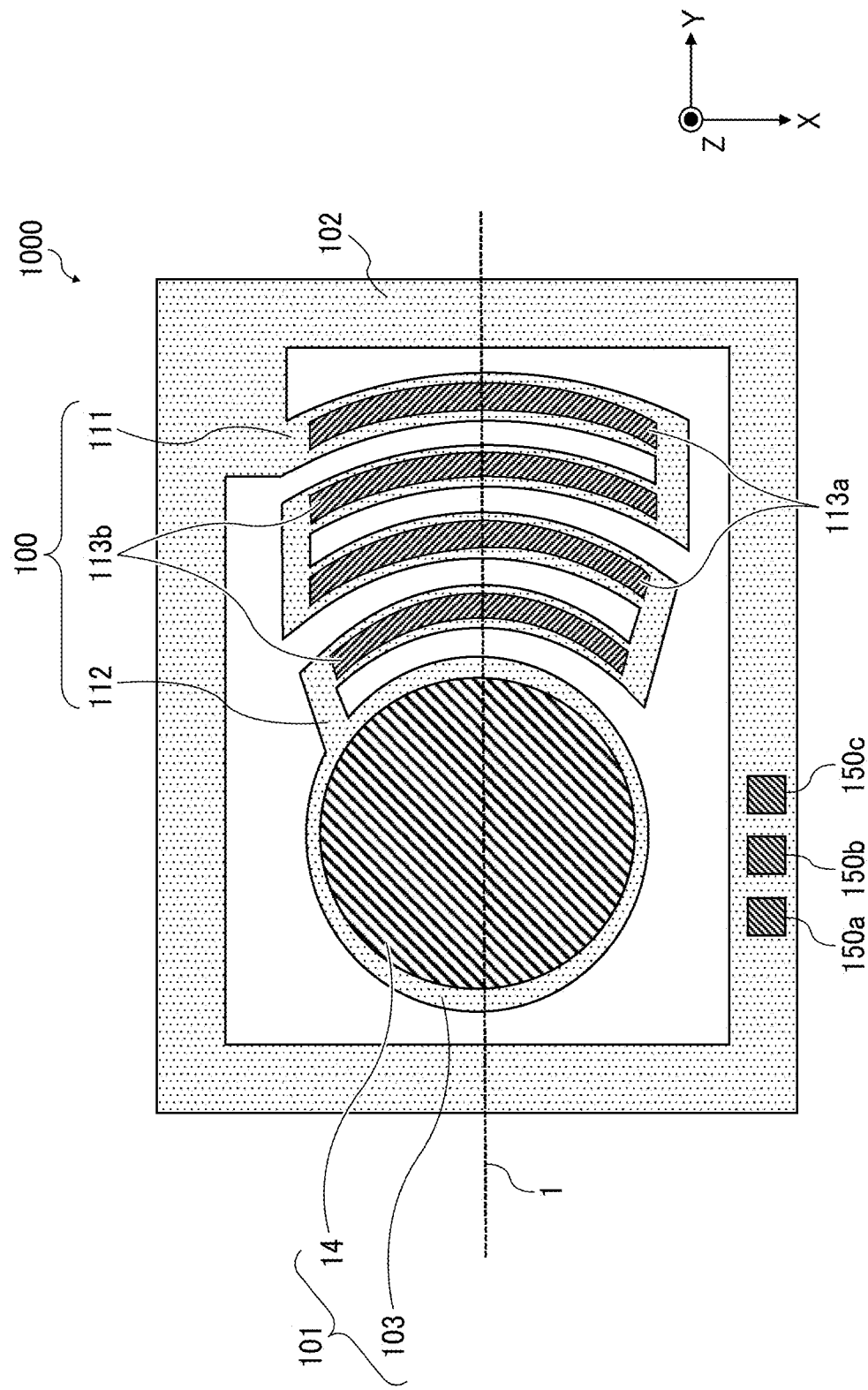
FIG. 3 is a diagram of a movable device with one drive unit according to a reference example.

The rotation axis will be described. FIG. 3 is an illustration of a movable device including one driver, according to a reference example. In the driver 100, the piezoelectric portion 122 of each of the piezoelectric drivers 113a and 113b is deformed when a drive voltage is applied thereto via the upper electrode 123 and the lower electrode 121 of each of the piezoelectric drivers 113a and 113b.

With such deformation of the piezoelectric portion 122, the piezoelectric drivers 113a and 113b are bent and deformed. As a result, a driving force around the first rotation axis 1 acts on the movable portion 101 via the connection portion 112, and the movable portion 101 moves around the first rotation axis 1. The drive voltages are applied to the driver 100 under the control of the control device 11.

Figure 4:
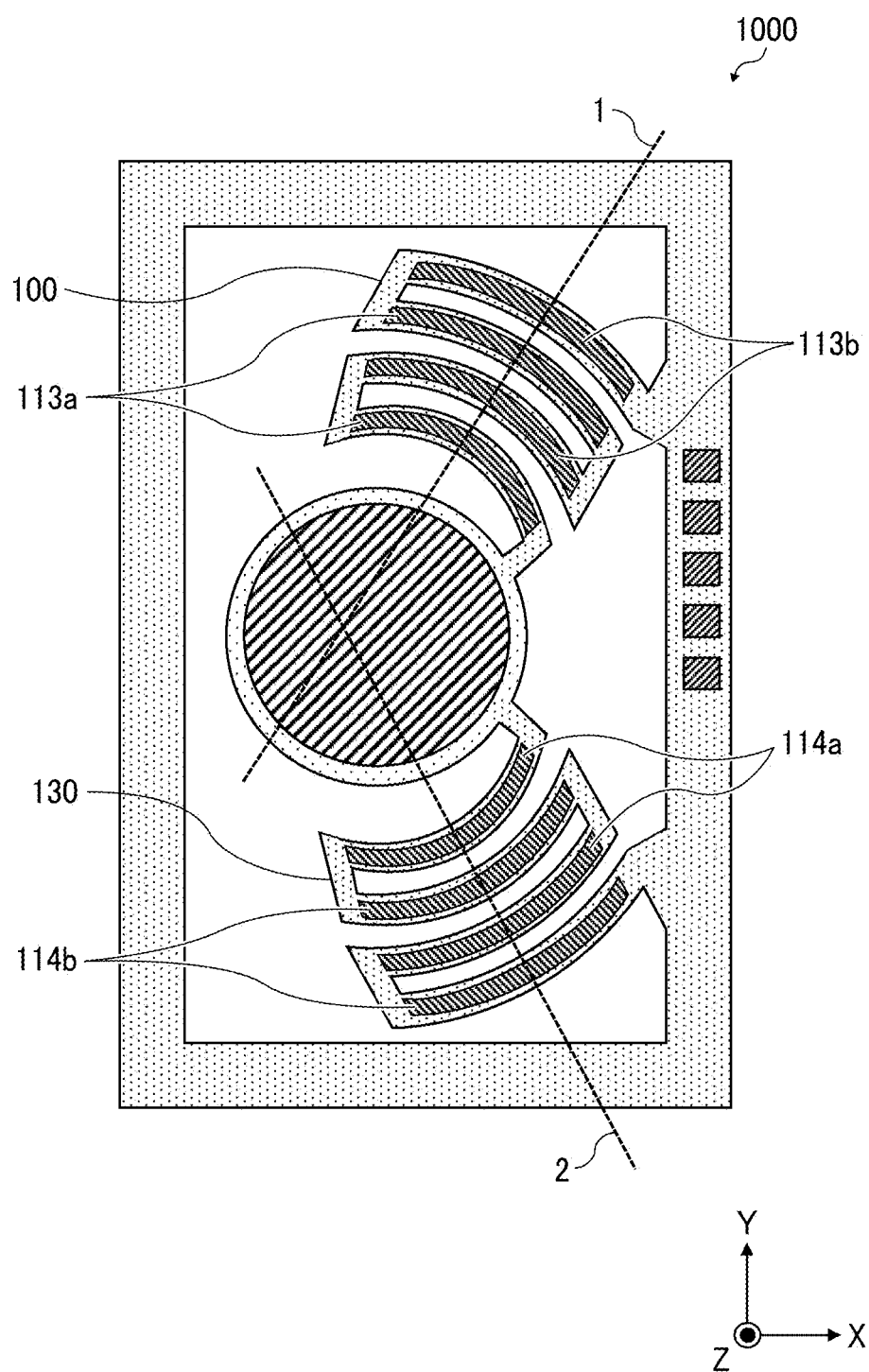
FIG. 4 is another plan view of a configuration of a movable device according to the first embodiment.

The following describes rotation axes of the present embodiment. FIG. 4 is an illustration of the rotation axes according to the present embodiment. With an alternating voltage applied to piezoelectric drivers 113a and 113b (the first driver) and no voltage applied to piezoelectric drivers 114a and 114b (the second driver), the movable portion 101 rotates or moves rotationally in positive and negative directions about a first rotation axis 1. With an alternating voltage applied to the piezoelectric drivers 114a and 114b (the second driver) and no voltage applied to the piezoelectric drivers 113a and 113b (the first driver), the movable portion 101 rotates about a second rotation axis 2.

The first rotation axis 1 intersecting with the second rotation axis 2 enables two-dimensional rotation control of the movable portion 101. This allows the rotation axis of the movable portion 101 to be in any desired direction when a voltage is applied to the first drive unit and the second drive unit.

The control device 11 is a voltage controller that control voltage applied to the piezoelectric drivers 113a and 113b and the piezoelectric drivers 114a and 114b. The control device 11 changes the direction of the rotation axis of the movable portion 101 when voltage is applied to the piezoelectric drivers 113a and 113b and the piezoelectric drivers 114a and 114b.

In the movable device 1000 according to the present embodiment, the movable portion 101 is coupled to the first member 100 including the first drive unit through the connecting portion 111 (as illustrated in FIG. 1). The movable portion 101 has a free end portion opposite to the first connecting portion 111 across the first rotation axis 1 between the free end portion and the first connecting portion 111. The free end portion opposite to the first connecting portion across the first rotation axis 1 therebetween allows a wider movable range of the movable portion 101. This configuration allows an increase in the movable range of the movable portion 101 that rotates about a rotation axis in a certain direction when the voltages are applied to the first drive unit and the second drive unit.

In the movable device 1000 according to the present embodiment, the movable portion 101 is coupled to the second member 130 including the second driver through the second connecting portion 115 (as illustrated in FIG. 1). The movable portion 101 has a free end portion opposite to the second connecting portion 115 across the second rotation axis 2 between the free end portion and the second connecting portion 115. The free end portion opposite to the first connecting portion across the first rotation axis 1 therebetween allows a wider movable range of the movable portion 101. The wider movable range of the movable portion 101 increase the number of directions along the rotation axis when voltage is applied to the first drive unit and the second drive unit.

In the movable device 1000 according to the present embodiment, an angle between a straight line passing through the connecting portion 111 and the center of the movable portion 101 and a straight line passing through the second connecting portion 115 and the center of the movable portion 101 is 90 degrees or less.

When straight lines passing through the center of the movable portion 101 are drawn from the first connecting portion 111 and the second connecting portion 115, an intersection point occurs at the center of the movable portion 101. An angle formed by the two straight lines at the intersection point (i.e., an angle formed by the straight line between the first connecting portion 111 and the center of the movable portion 101 and the straight line between the second connecting portion 115 and the center of the movable portion 101) is referred to as the angle. The angle is an interior angle of a triangle formed by the center of the movable portion 101, the first connecting portion 111, and the second connecting portion 115. The angle is 90 degrees or less.

This configuration increases the movable range of the movable portion 101 that rotates about two rotation axes orthogonal to each other when a voltage is applied to the first drive unit and the second drive unit.

Figure 5:
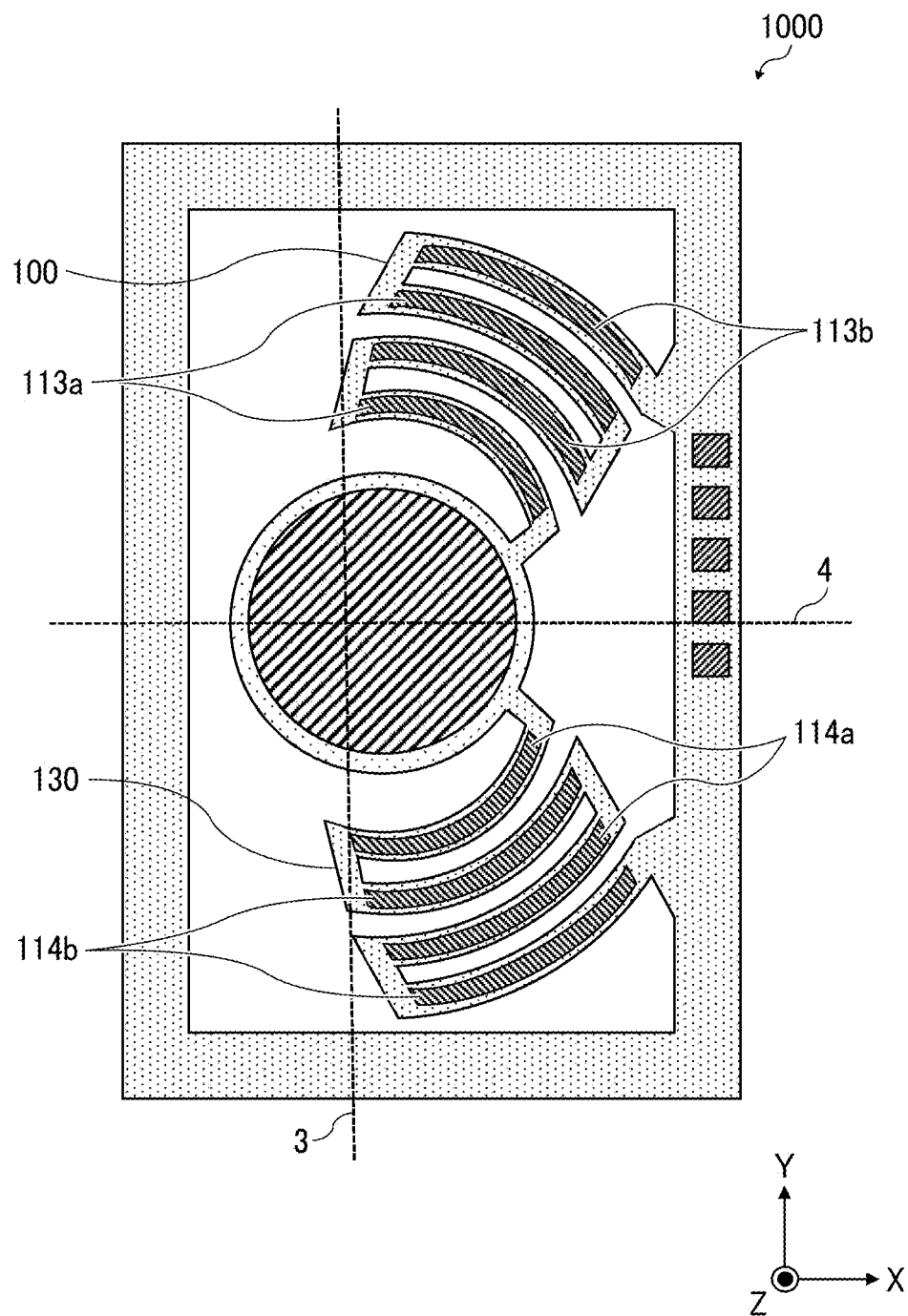
FIG. 5 is another plan view of a configuration of a movable device according to the first embodiment.
Figure 8A:
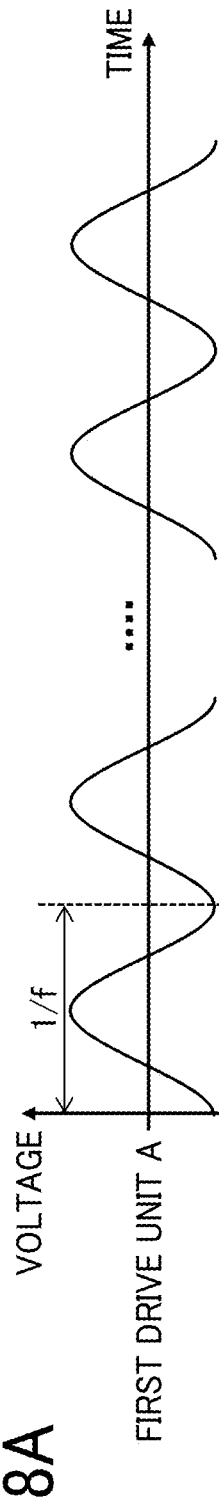
Figure 8B:
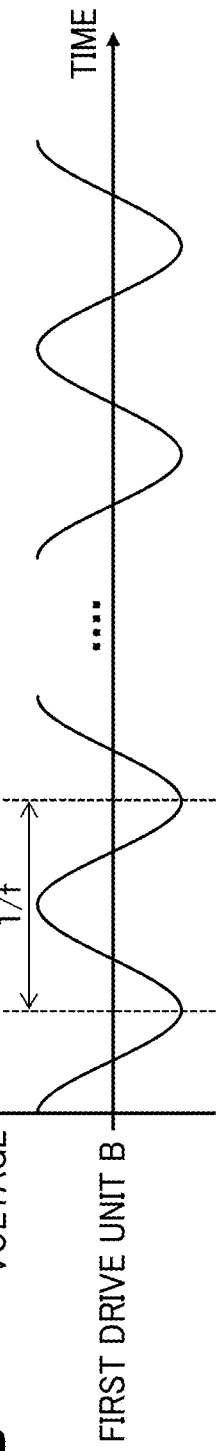
Figure 8C:
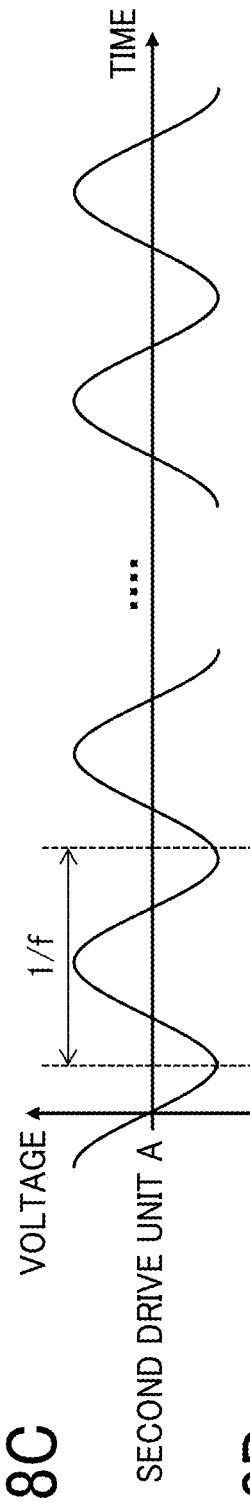
Figure 8D:
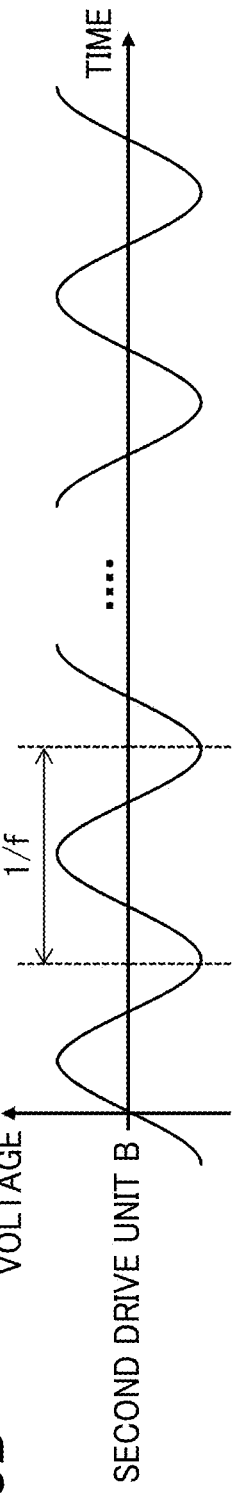

FIG. 5 is an illustration of rotation axes of the movable device according to an embodiment of the present disclosure. A drive voltage having a predetermined sinusoidal waveform is applied in parallel to the piezoelectric drivers 113*a* and 113*b* as the first drive unit under the control of the control device 11. At the same time, a driving voltage having a predetermined sinusoidal waveform and the same phase is applied to the piezoelectric drivers 114*a* and 114*b* as the second driver. The movable portion 101 is movable around the third rotation axis 3 in a cycle of a predetermined sinusoidal drive voltage.

A drive voltage having a predetermined sinusoidal waveform is applied to the piezoelectric drivers 113*a* and 113*b* under the control of the control device 11. At the same time, a drive voltage having a predetermined sinusoidal waveform and the opposite phase is applied to the piezoelectric drivers 114*a* and 114*b* as the second driver.

This allows the movable portion 101 to move around the fourth rotation axis 4 in a cycle of a predetermined sinusoidal drive voltage. The movable portion 101 is rotated about the third rotation axis 3 by driving the first driver 100 and the second driver 130 at the same phase. By contrast, the movable portion 101 is rotated about the fourth rotation axis 4 substantially perpendicular to the third rotation axis 3 by driving the first driver 100 and the second driver 130 at the opposite phases.

The third rotation axis 3 is parallel to a straight line connecting the first connecting portion 111 between the movable portion 101 and the first member 100 including the first drive unit and the second connecting portion 115 between the movable portion 101 and the second member 130 including the second drive unit. The third rotation axis 3 is parallel to a straight line passing through two points: a point of the first connecting portion 111 and another point of the second connecting portion 115.

Such a desired design of the connection portions allows control of the center of rotation.

The center of the rotation of the mirror (i.e., the reflecting surface 14) matching the center of the movable portion allows elimination of a process for adjusting the center of the movement during attachment of optical components.

Further, the center of the mirror coincide with the center of the rotation allows a reduction in the cost for mounting and manufacturing optical components and alleviates optical errors.

Changing the phase difference between the first phase of the voltage applied to the first drive unit and the second phase of the voltage applied to the second drive unit allows a change in the direction of the rotation axes of the movable portion 101. The voltage controller (or the control device 11) may change the difference between the voltage applied to the first drive unit and the voltage applied to the second drive unit or may change a ratio therebetween.

In the present embodiment, the rotation axis of the movable portion 101 is the third rotation axis 3 when the first drive unit and the second drive unit are driven at the same phase, and the rotation axis of the movable portion 101 is the fourth rotation axis 4 when the first drive unit and the second drive unit are driven at the opposite phases. In this configuration, the first rotation axis 1 of the movable portion 101 when the first drive unit alone is driven is offset from the second rotation axis 2 of the movable portion 101 when the second drive unit alone is driven in a plan view. The plan view refers to the XY plane in FIG. 5.

In other words, for each of the first member 100 including the first drive unit and the second member 130 including the second drive unit, the rotation of the movable portion 101 has vectors of both the first rotation axis 1 and the second rotation axis 2. The first drive unit and the second drive unit are controlled to be driven independently or in combination to cause the movable portion 101 to oscillate in a desired direction and allow Lissajous scanning or vector scanning in the drawing region.

Each of the first member 100 including the first drive unit and the second member 130 including the second drive unit is positioned at substantially 45 degrees relative to the third rotation axis 3 and the fourth rotation axis 4. In other words, a line extending from the center of the movable portion 101 to the center of each driver is preferably offset from the third rotation axis 3 and the fourth rotation axis 4 by substantially 45 degrees in the plan view (i.e., the XY plane).

The angle between the third rotation axis 3 and the line passing through the first connecting portion 111 and the center of the movable portion 101 is substantially 45 degrees. The angle between the fourth rotation axis 4 and the line passing through the first connecting portion 111 and the center of the movable portion 101 is substantially 45 degrees.

The angle between the third rotation axis 3 and the line passing through the second connecting portion 115 and the center of the movable portion 101 is substantially 45 degrees. The angle between the fourth rotation axis 4 and the line passing through the second connecting portion 115 and the center of the movable portion 101 is substantially 45 degrees.

Within the context of the present disclosure, "substantially 45 degrees" refers to an angle in a range from 35 to 55 degrees.

This configuration optimizes the degree of two-axis operation efficiency and increases two-dimensional deflection angle and its scanning amplitude. The details of the shapes of the first connecting portion 111 connecting the first member 100 including the first drive unit with the movable portion 101 and the second connecting portion 115 connecting the second member 130 including the second driving portion with the movable portion 101 are not limited to those in this embodiment.

The center of rotation can be designed based on the relation between first connecting portion 111 connecting the first member 100 including the first drive unit with the movable portion 101 and the second connecting portion 115 connecting the second member 130 including the second driving portion with the movable portion 101. The angle between the first straight line connecting the first connecting portion 111 and the center of the movable portion 101 and the second straight line connecting the second connecting portion 115 and the center of the movable portion 101 is preferably substantially 90 degrees in the planar view. However, this angle is not limited to the present embodiment. Further, the drivers each may have a function other than driving. For example, the drivers each may detect displacement of a component, or serves as a heater or electric wiring. In addition, the shape of the movable portion is not limited to the embodiment.

FIGS. 6A, 6B, 7A, and 7B are graphs for explaining a method for driving the drivers, according to an embodiment of the present disclosure. FIGS. 6A and 6B are graphs of drive signal waveforms of the first drive unit and the second drive unit according to an embodiment of the present disclosure. The signal waveform has a periodicity of frequency f.

FIGS. 6A and 6B present a case in which the first drive unit and the second drive unit are driven at the same phase, and the movable portion 101 rotates about the third rotation axis 3. FIG. 6A is a graph of a waveform of voltage applied to the first drive unit A (the piezoelectric drivers 113a) and the second drive unit A (the piezoelectric drivers 114a). FIG. 6B is a graph of a waveform of voltage applied to the first drive unit B (the piezoelectric drivers 113b) and the second drive unit B (the piezoelectric drivers 114b).

FIGS. 7A and 7B present drive signal waveforms when the first drive unit and the second drive unit are driven at the opposite phases, and the movable portion 101 rotates about the fourth rotation axis 4. FIG. 7A is a graph of a waveform of voltage applied to the first drive unit A (the piezoelectric drivers 113a) and the second drive unit B (the piezoelectric drivers 114b). FIG. 7B is a graph of a waveform of voltage applied to the first drive unit B (the piezoelectric drivers 113b) and the second drive unit A (the piezoelectric drivers 114a).

FIGS. 8A, 8B, 8C, and 8D are graphs for explaining a driving method. Voltage of a drive waveform is applied to the first drive unit A (the piezoelectric drivers 113a) and the second drive unit B (the piezoelectric drivers 114b) at the opposite phase. Voltage of a drive waveform is applied to the second drive unit A (the piezoelectric drivers 114a) and the second drive unit B (the piezoelectric drivers 114b) at the opposite phase. The waveform of the second drive unit A (piezoelectric drivers 114a) is shifted in phase by 90 degrees from the waveform of the first drive unit A (piezoelectric driver 113a).

In this configuration, the driving method according to the present embodiment involves drawing a circle optical scanning locus of the movable portion 101. Although all the drive waveforms have the same frequency in the embodiment, no limitation is intended thereby. The frequency, amplitude and phase of each input waveform may be freely changed.

Figure 9:
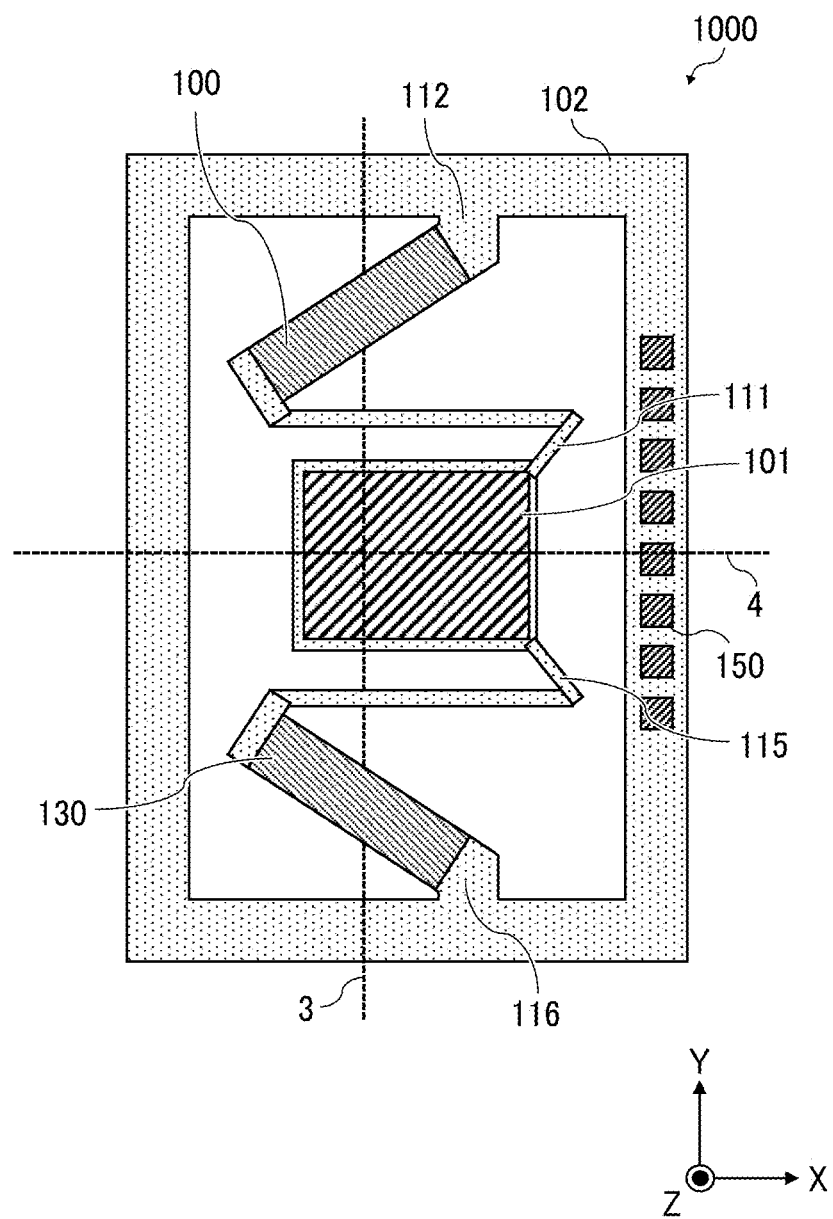
FIG. 9 is a graph of a movable device with a driving unit including one beam, according to a first modification of an embodiment.

FIG. 9 is an illustration of a movable device according to a first modification of the present embodiment. In the movable device 1000 according to the first modification, each member including a drive unit has one beam structure. One end of each of the first member and the second member is coupled to the movable portion 101, and the other end thereof is coupled to the support body 102.

When the first drive unit and the second drive unit are driven at the same phase, the movable portion rotates about the third rotation axis 3. When the first drive unit and the second drive unit are driven at the opposite phase, the movable portion rotates about the fourth rotation axis 4. Vector scanning or Lissajous scanning can be performed with a smaller number of driving signal lines than in the conventional example.

Figure 10:
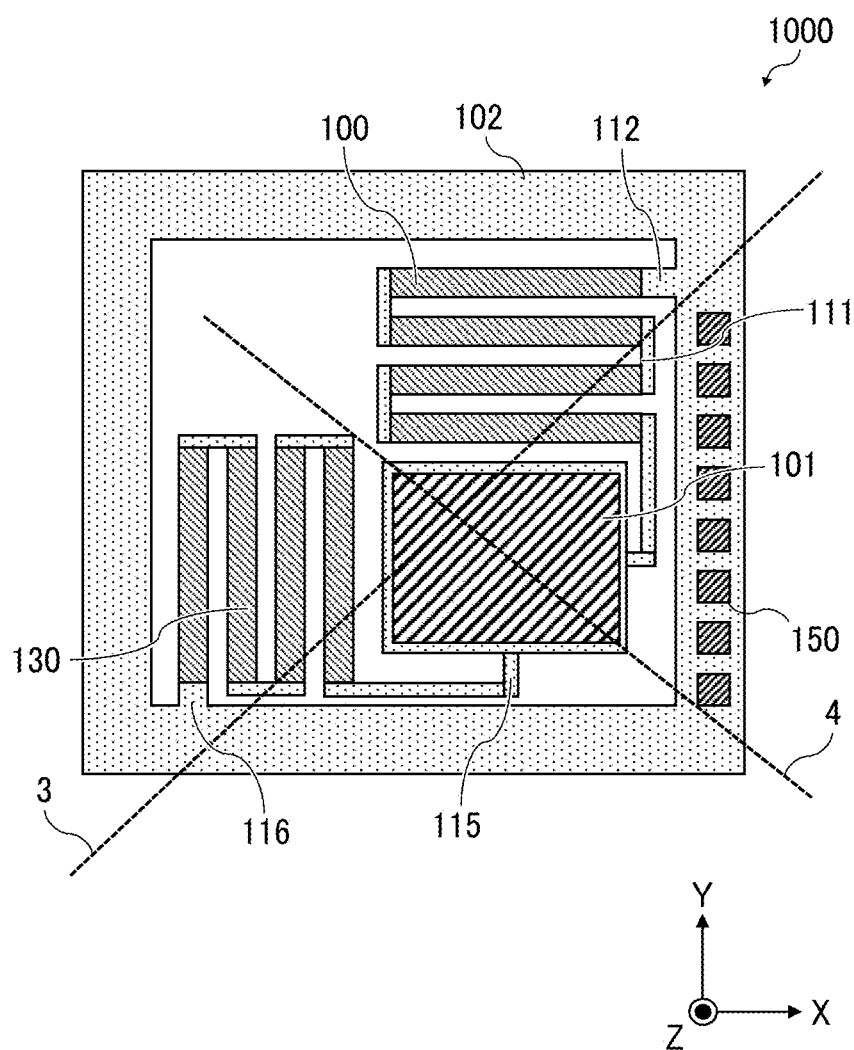
FIG. 10 is a shows a second modification (a meander structure having linear beams)

FIG. 10 is an illustration of a movable device according to a second modification of the present embodiment. In the movable device 1000 according to the second modification, each member including a drive unit has a meandering structure with straight-line beams.

The beam shape of the first member including the first drive unit and the beam shape of the second member including the second drive unit have a curvature of a concentric circle of the movable portion 101 as illustrated in FIG. 1 or are parallel to the outer periphery of the movable portion 101 as illustrated in FIG. 10. In other words, each of the first member and the second member has a beam structure including one or more beams, each having a linear shape parallel to at least one side of the movable portion having, for example, a parallelogram. Such beam shapes allow a reduction in the chip size.

Figure 11:
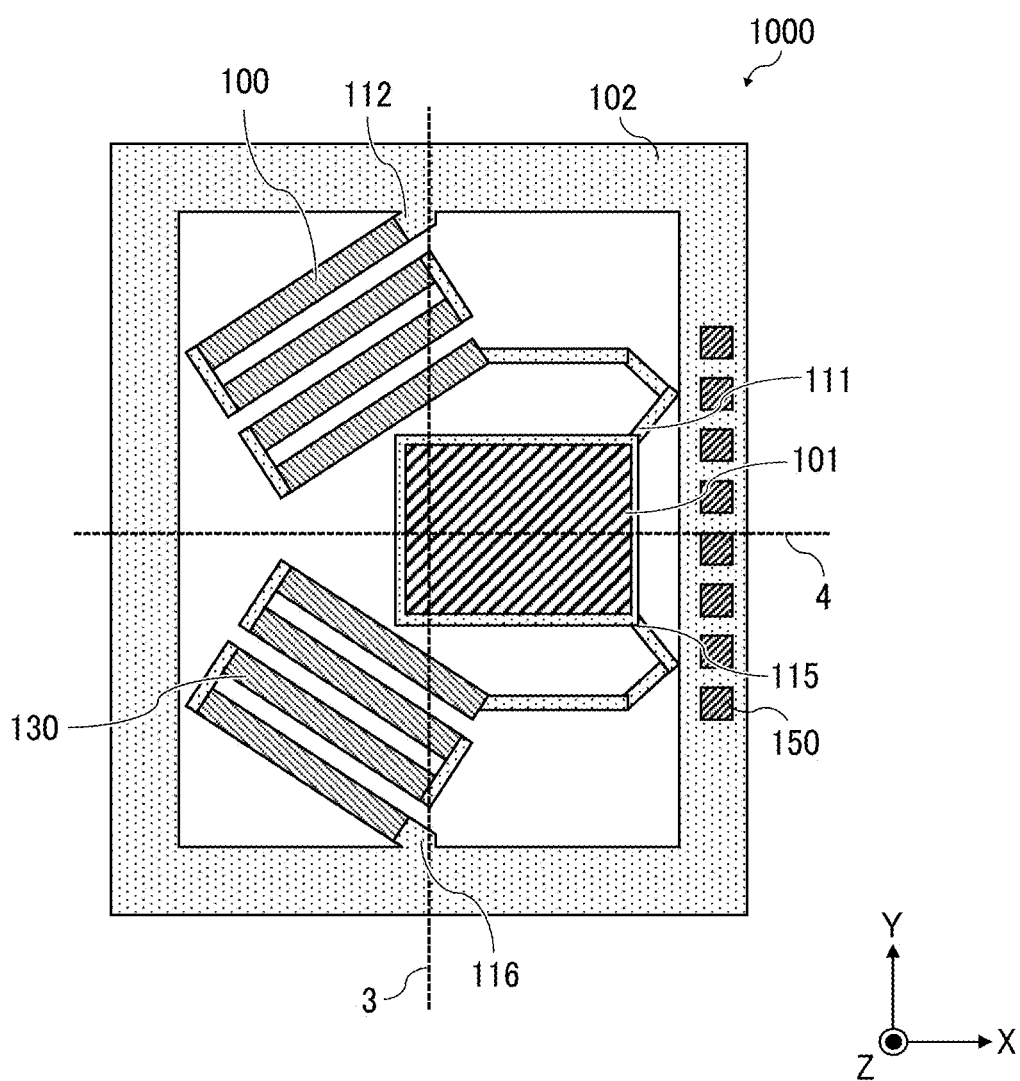
FIG. 11 is an illustration of a movable device having a meandering structure in which beams extend in an extension direction offset from each of the third rotation axis and the fourth rotation axis, according to a third modification of an embodiment of the present disclosure.

FIG. 11 is an illustration of a movable device according to a third modification of the present embodiment.

In the movable device 1000 according to the third modification, a first member including a first drive unit (beams) and a second member including a second drive unit (beams) each have a meandering structure. The beams included in each meandering structure extends in an extension direction inclined relative to each of the third rotation axis 3 and the fourth rotation axis 4 in the plane view (i.e., the XY plane in FIG. 11) of the support body. Although the details of the extension direction of the beams are not limited to the present embodiment, the extension direction of the beams is preferably inclined relative to each of the third rotation axis 3 and the fourth rotation axis 4 by substantially 45 degrees. This configuration allows a higher deflection angle of the mirror (i.e., the reflecting surface of the movable portion 101).

Figure 12:
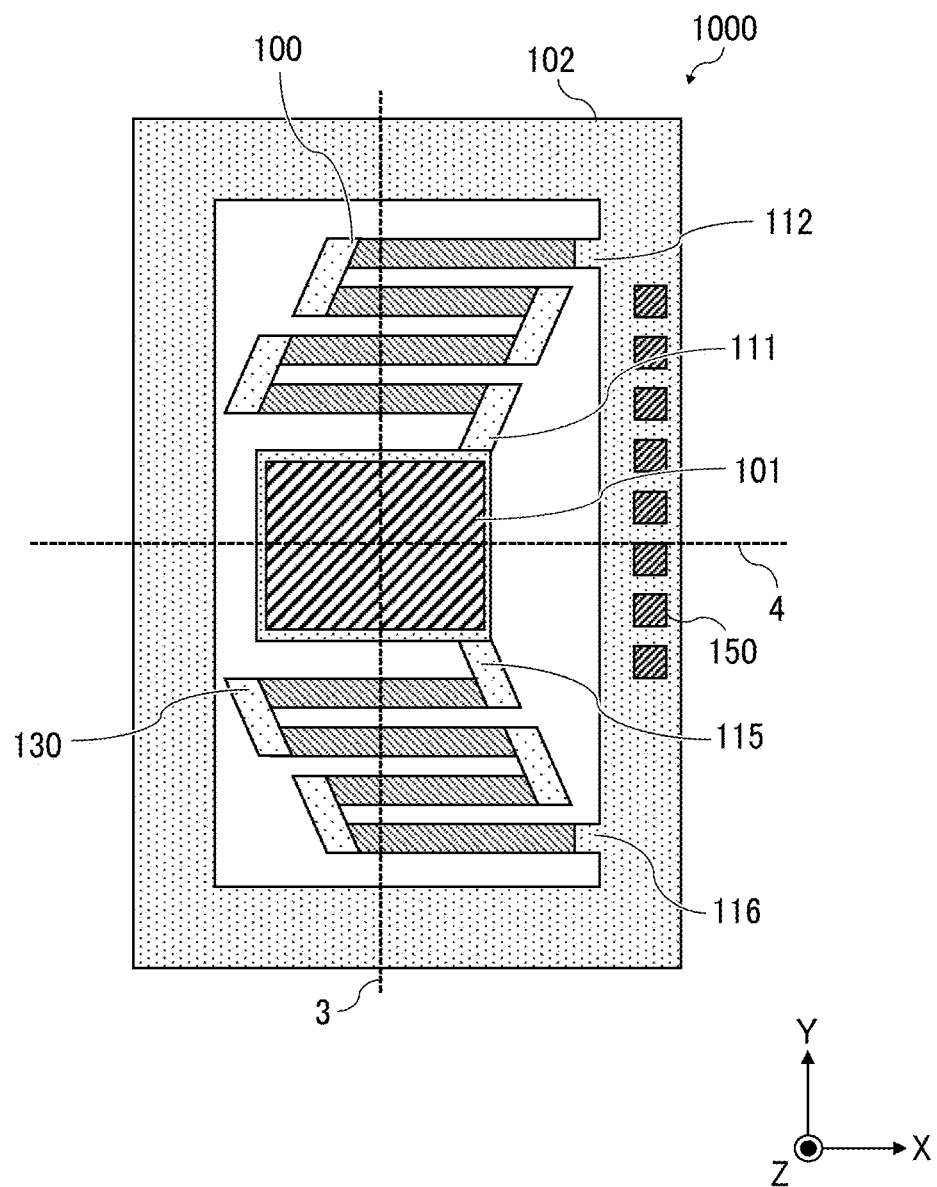
FIG. 12 is an illustration of a movable device having a meandering structure in which beams are offset from each other in a direction not parallel to the third rotation axis and the fourth rotation axis, according to a fourth modification of an embodiment of the present disclosure.

FIG. 12 is an illustration of a movable device according to a fourth modification of the present embodiment. In the movable device 1000 according to the fourth modification, straight-line beams included in a first member 100 of a first drive unit and straight-line beams included in a second member 130 of a second drive unit each define a meandering structure. The straight-line beams in each of the first member 100 and the second member 130 are inclined in a direction not parallel to the third rotation axis 3 and joined to turn.

In the present modification, the details of the shape and position of the connecting portion are not limited to those in the embodiment. However, when the connecting portion is located at a position offset by approximately 45 degrees from each of the third rotation axis 3 and the fourth rotation axis 4, the deflection angle of the movable portion 101 that rotates about each of the third rotation axis 3 and the fourth rotation axis 4 becomes largest.

Figure 13:
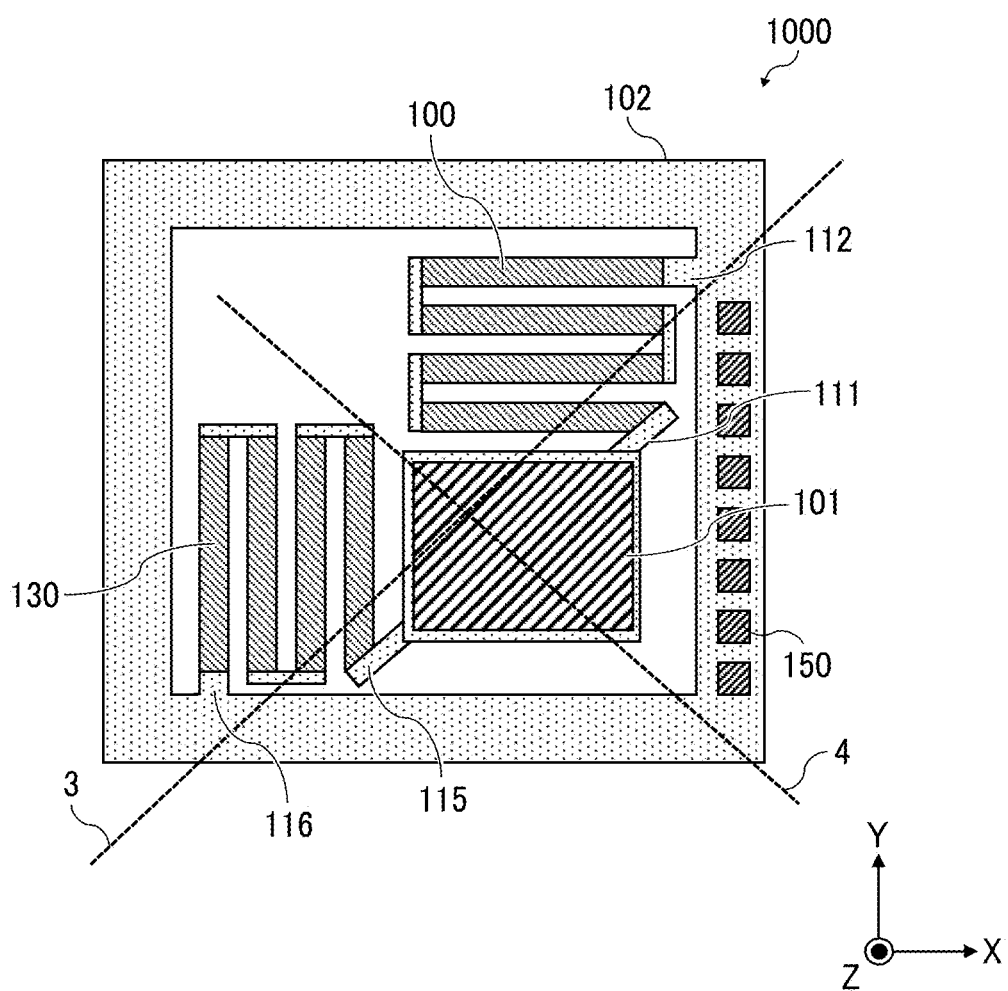
FIG. 13 is an illustration a movable device in which connecting portions are arranged in a direction parallel to the third rotation axis, according to a fifth modification of an embodiment of the present disclosure.
Figure 14:
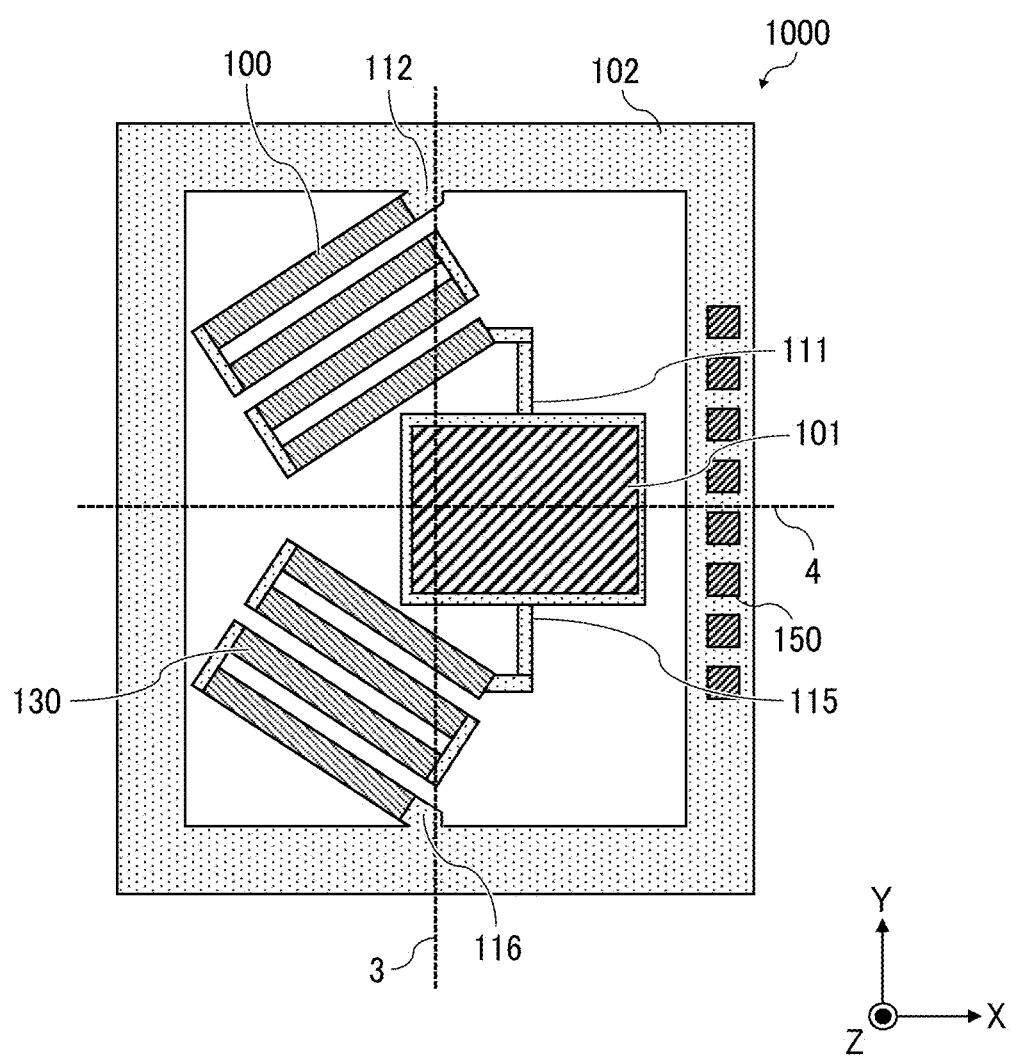
FIG. 14 is an illustration a movable device in which connecting portions are arranged in a direction parallel to the third rotation axis, according to a sixth modification of an embodiment of the present disclosure.

FIG. 13 is an illustration of a movable device 1000 according to a fifth modification of an embodiment of the present disclosure. FIG. 14 is an illustration of a movable device 1000 according to a modification of a sixth embodiment of the present disclosure. In the movable device 1000 according to the fifth modification, a connecting position at which a first connecting portion 111 connects a movable portion 101 to a first member 100 and another connecting portion at which a second connecting portion 115 connects the movable portion 101 to a second member 130 are on a diagonal line of the movable portion 101. In the movable device 1000 according to the sixth modification, a first side of the movable portion 101 on which a first connecting portion 111 is connected to the movable portion 101 and a second side of the movable portion 101 on which a second connecting portion 115 is connected to the movable portion 101 face each other.

In both the fifth modification and the sixth modification, a straight line passing through the first connecting portion 111 and the center of the movable portion 101 is parallel to the third rotation axis 3. Similarly, a straight line passing through the second connecting portion 115 and the center of the movable portion 101 is parallel to the third rotation axis 3. In this arrangement, the position of the third rotating axis 3 can be adjusted by adjusting the connecting portions while maintaining the parallelism.

In the movable device 1000 according to the sixth modification, a connecting portion 112 connecting a support body 102 and the first member 100 and a connecting portion 116 connecting the support body 102 and the second member 130 are located symmetrically with respect to the movable portion 101 and the fourth rotation axis 4. This arrangement prevents or reduces tilt of the movable portion 101 due to its own weight about the third rotation axis 3 when the movable device 1000 is at rest. Reducing or preventing the tilt of the surface of the movable portion 101 when the movable device 1000 is at rest prevents or reduces the resonance of the movable portion 101 in the direction along the third rotation axis 3 and thus stabilizes the operation of the movable device 1000.

This allows a reduction in a person-hour load due to adjustment of optical components in the optical system including the movable device.

Figure 15:
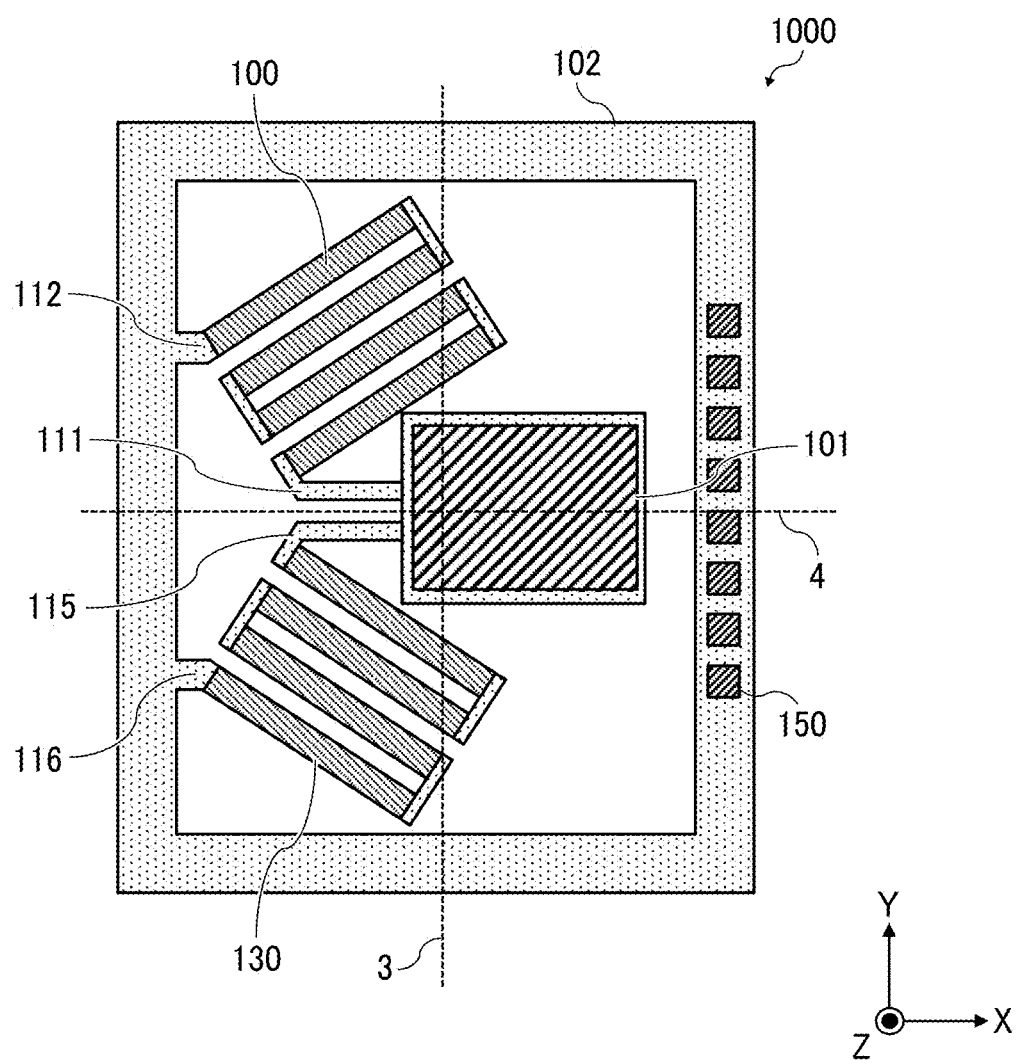
FIG. 15 is an illustration a movable device in which connecting portions are asymmetric with respect to the third rotation axis, according to a seventh modification of an embodiment of the present disclosure.

In the movable device according to a seventh modification in FIG. 15, the movable portion 101 is not between a connecting portion 112 connecting the support body 102 and the first member 100 and a connecting portion 116 connecting the support body 102 and the second member 13. The connecting portion 112 and the connecting portion 116 are located symmetrically with respect to the fourth rotation axis 4. In this arrangement, the first member 100, the second member 130, the first connecting portion 111, and the second connecting portion 115 allows a pseudo cantilever structure with the movable portion 101 having a free end. This enables a large oscillation of the movable portion 101.

Figure 16:
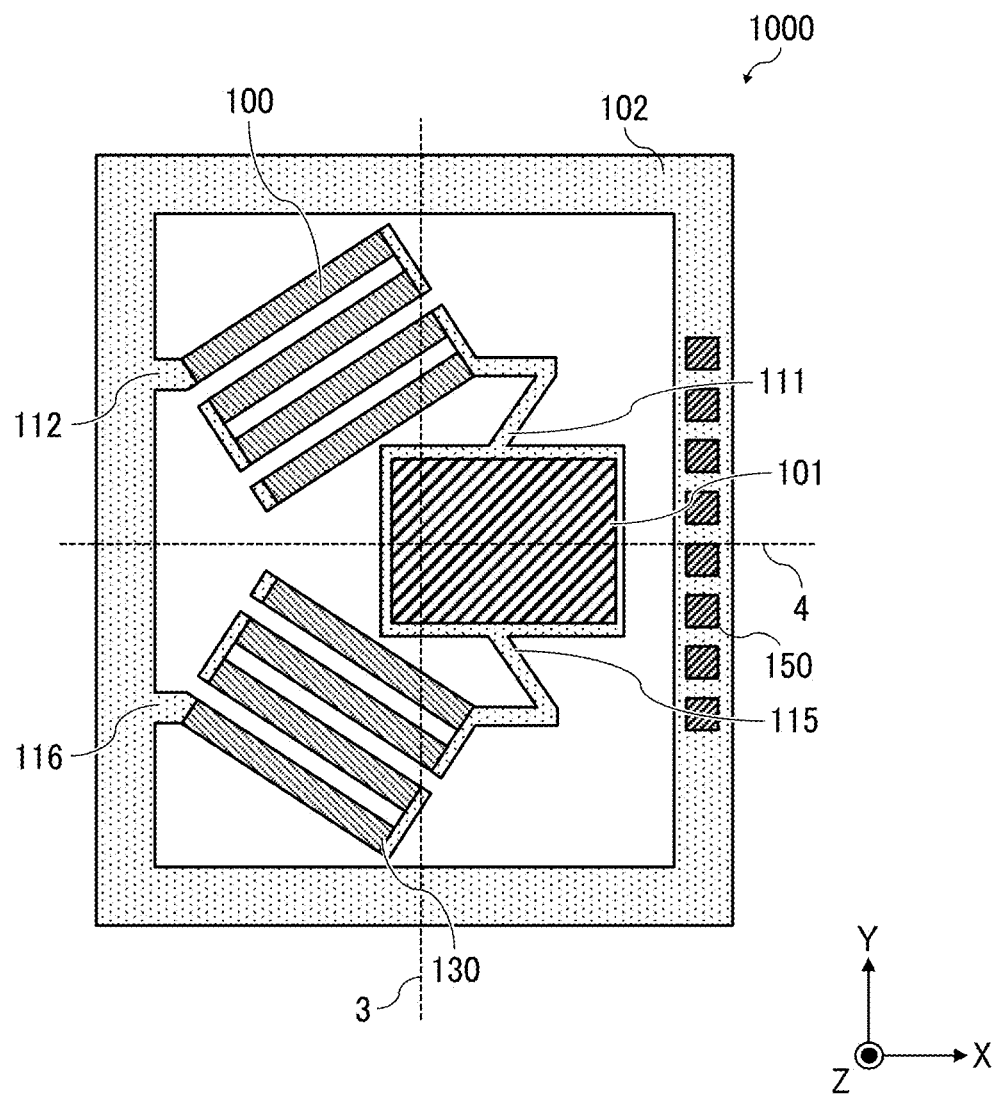
FIG. 16 is an illustration a movable device in which connecting portions between a support body and the movable portion are asymmetric with respect to the third rotation axis, according to an eighth modification of an embodiment of the present disclosure.

In the movable device 1000 according to the eighth modification in FIG. 16, the relative position between the connecting portion 112 and the connecting portion 116 are the same as in the seventh embodiment. The connecting portion 112 and the connecting portion 116 are at one side of the third rotation axis 3, and the connecting portion 111 and the connecting portion 115 are at another side of the third rotation axis 3. This arrangement allows a larger oscillation of the movable portion 101 and prevents or reduces the tile of the movable portion 101 about the third rotation axis 3. This achieves higher scanning line quality and lower person-hour load due to the adjustment of the optical system.

Figure 17:
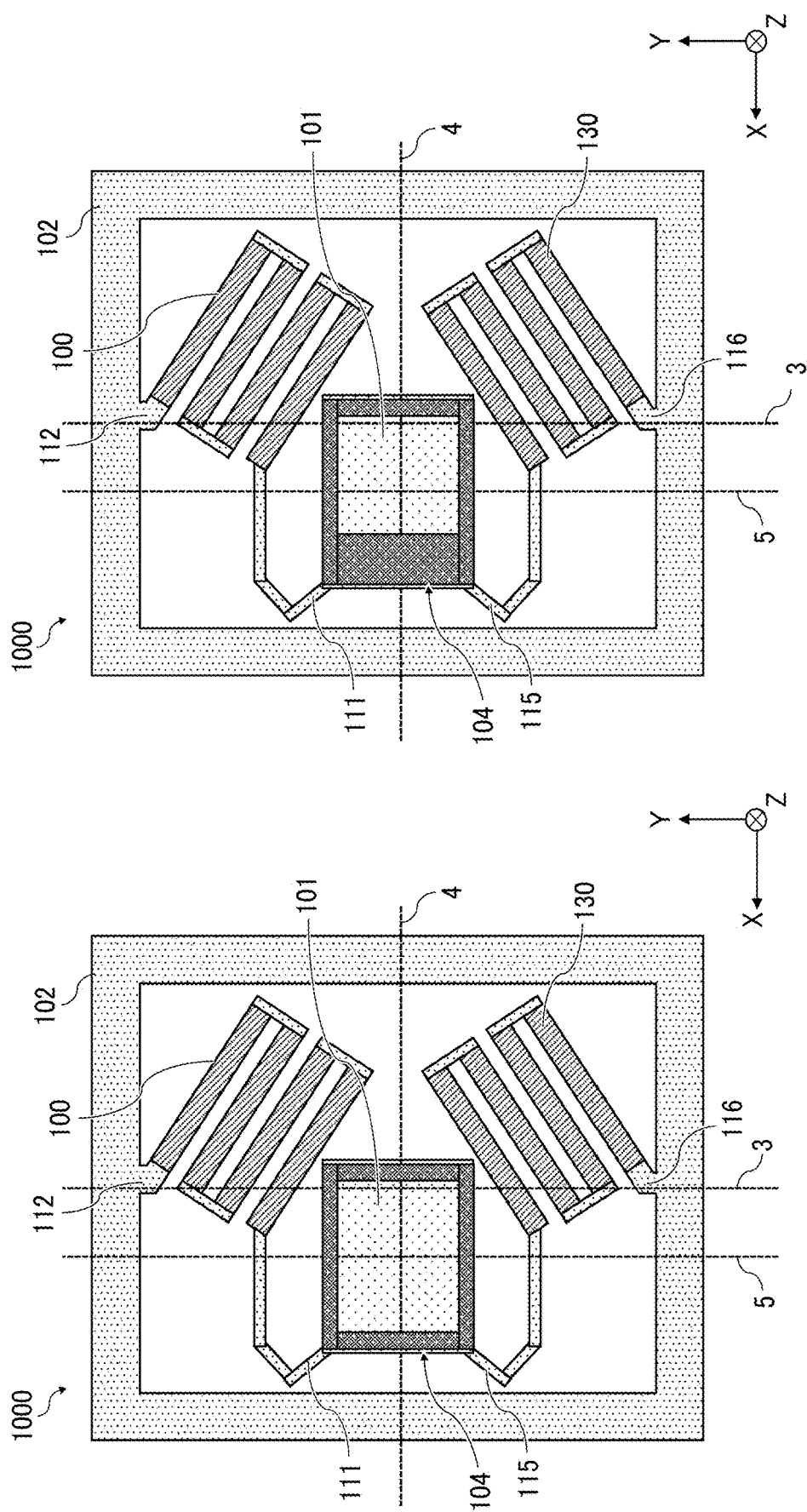
FIG. 17A is an illustration of a movable device according to a ninth modification in which a substrate for the movable portion is symmetrical about a line parallel to the third rotation axis and passing through the center of the movable portion.
FIG. 17B is an illustration of the movable device according to the ninth modification in which the substrate is asymmetrical about the line.

FIGS. 17A and 17B are illustrations of a movable device according to a ninth modification of the present embodiment. FIGS. 17A and 17B are illustrations of a supporting structure that increases the stiffness of a mirror base of the movable portion 101 and reduces the amount of deformation of its surface. In FIG. 17A, a substrate 104 for the movable portion 101 having a support structure is line-symmetric with respect to a line 5 parallel to the third rotation axis 3 and passing through the center of the movable portion 101 in the plane view (i.e., the XY plane). In FIG. 17B, the substrate 104 for the movable portion 101 is asymmetrical with respect to the line 5. The support structure is not limited to embodiments of the present disclosure. The asymmetric structure of the substrate 104 allows the center of gravity of the movable device 1000 as a whole to be closer to the center of the movable portion 101.

Figure 18:
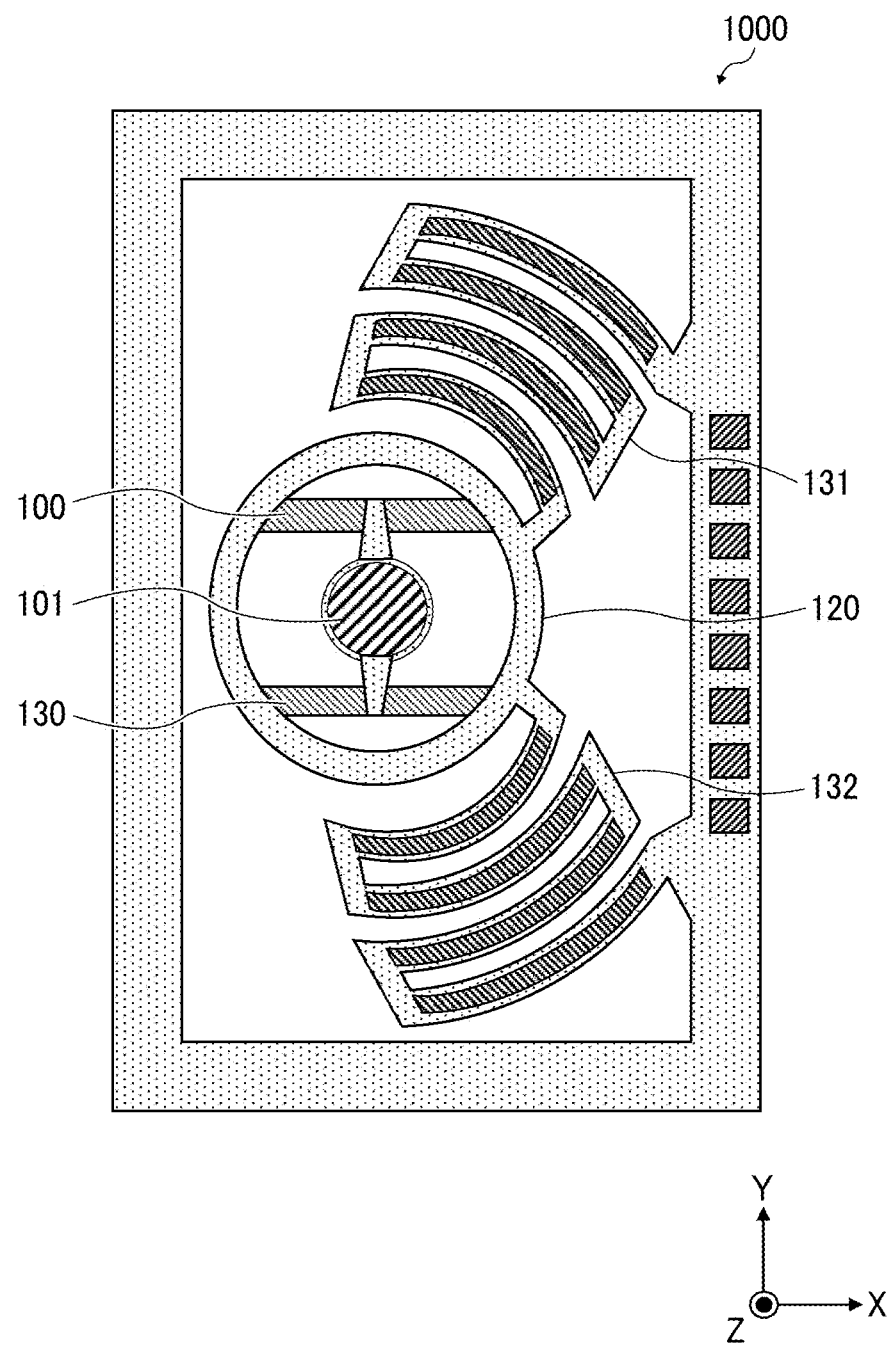
FIG. 18 is an illustration of a movable device including another drive unit within a movable portion, according to a tenth modification of an embodiment of the present disclosure.

FIG. 18 is an illustration of a movable device 1000 according to a tenth modification of an embodiment of the present disclosure. The movable device 1000 according to the tenth modification includes another drive unit within the structure of a movable portion 101. In the movable device 1000 of the tenth modification, a third member 131 including a third drive unit and a fourth member 132 including a fourth driven unit, which are included in the support body 102. The third member 131 and the fourth member 132 are coupled to a second support body 120. The movable device 1000 of the tenth modification includes a first member 100, a second member 130, and the movable portion 101 withing the second support body 120.

The movable device of the tenth modification including four drive units is capable of two-dimensional optical deflection.

The movable device of the tenth modification allows the application of a combination of raster scan and vector scan. Since the raster scan can be multiplied by the vector scan, the center position of the drawing region generated by the raster scan can be changed at a predetermined timing by changing the center voltage of each drive unit. As an example, a usage method of drawing an image by raster scanning while switching an image display position by vector scanning is assumed.

The shape of each component is not limited to the shape of the embodiment. The material, manufacturing process, electrical connection, and control method can be implemented in the same configuration as in FIG. 1, but are not limited to the example of the embodiment. The driving method of the drive body (the drive units) is not limited to piezoelectric driving. It may be an electrostatic drive, an electromagnetic drive or a thermoelectric drive.

The reference voltage (center voltage) is different for each drive unit, and is appropriately adjusted. The reference voltages (center voltages) of the first drive unit and the second drive unit may be different from each other. In the case of the meandering structure, the reference voltages of the drive unit A and the drive unit B in each driving unit may be different from each other.

Figure 19:
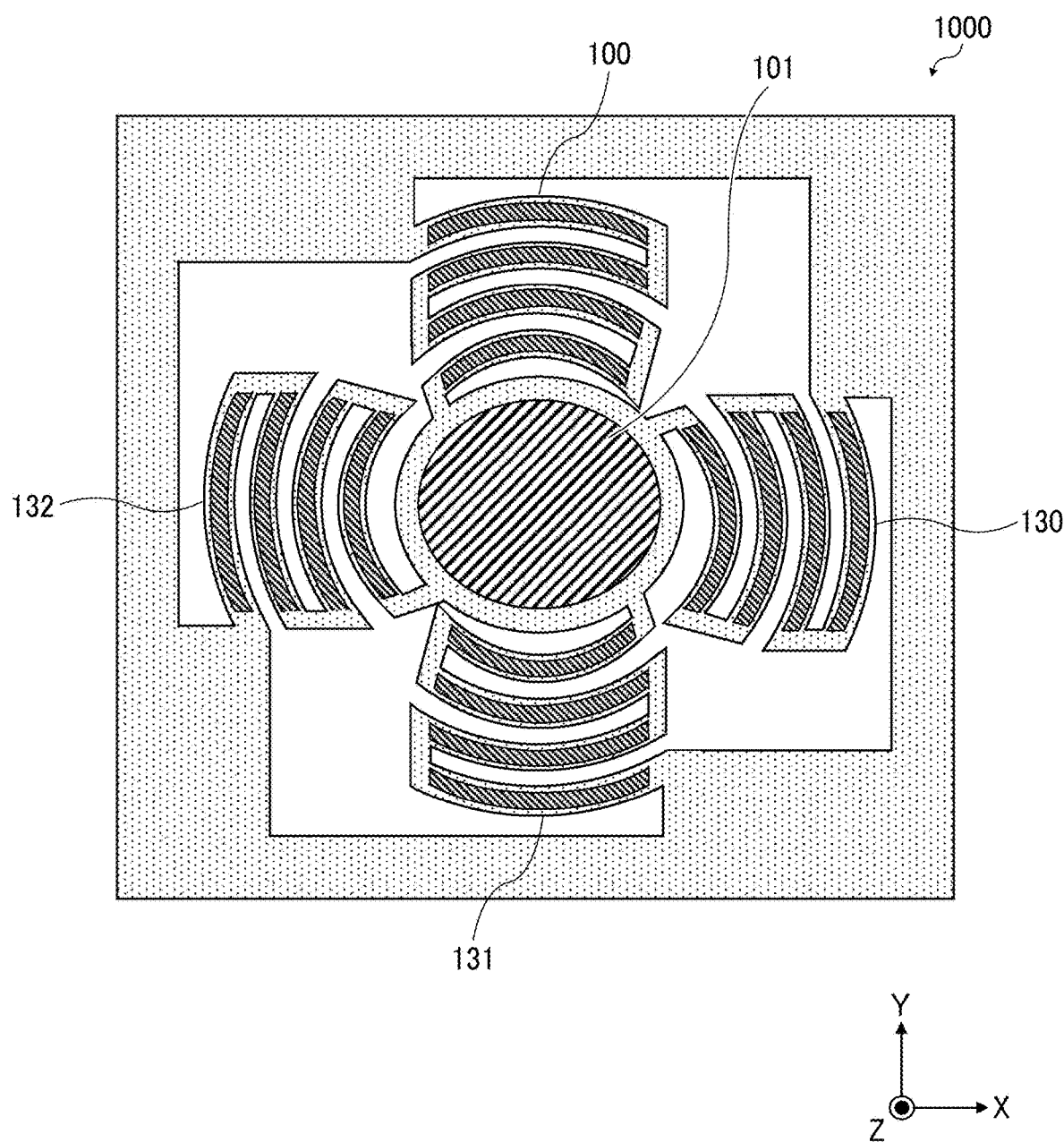
FIG. 19 is an illustration of a movable device including four drive units according to an eleventh modification of an embodiment of the present disclosure.

FIG. 19 is an illustration of a movable device 1000 according to an eleventh modification of the present embodiment. The movable device according to the present modification includes four drive units: a first member 100 including a first drive unit, a second member 130 including a second drive unit, a third member 131 including a third drive unit, and a fourth member 132 including a fourth drive unit. The drive units are coupled to the movable portion 101 by torsion beams. The rotation axis of the movable portion 101 is coincident with or parallel with each of the rotation axes about which the movable portion 101 is rotated by the four drive units independently driven.

Figure 20:
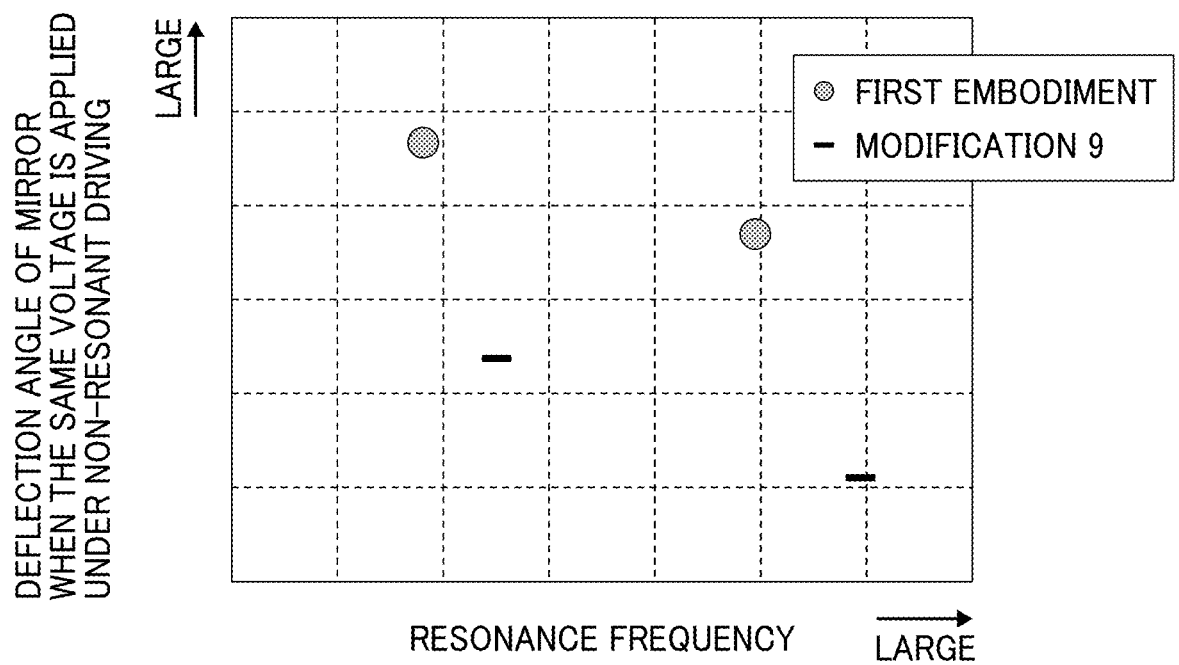
FIG. 20 is a graph of the comparative results of the first embodiment and the eleventh modification.

FIG. 20 is a graph of the comparative results between the first embodiment and the eleventh modification. The movable device 1000 of the eleventh modification including four members each including a drive unit causes the movable portion 101 to oscillate as illustrated in FIG. 19. According to the comparison results of the deflection angles of the mirror at the time of non-resonant driving during the oscillation of the movable portion 101 having the same mirror diameter, the present embodiment enables a higher deflection angle for the equivalent resonant frequency irrespective of whether the area of the drive unit is smaller or not.

Since the movable device of the present embodiment has two connecting portions between the member including the drive unit and the movable portion 101, the restriction of the movable portion 101 is weakened, and the movable portion 101 easily oscillates. This enables a higher deflection angle of the movable portion 101.

The movable device of the present embodiment including two members alone, each including a drive unit, and two connecting portions alone. This configuration of the first embodiment allows a reduction in the restraint on the movable portion 101 and an increase in the deflection angle of the movable portion 101 much more than the configuration including four connecting portions. The present embodiment further enables a simple structure and downsizing.

In the present embodiment, the number of drive units is reduced to two, and the number of signal lines is also reduced. Thus, the number of circuit components to be used is reduced. In addition, the size of the entire movable device can be reduced by the amount of reduction in the area of the drive unit. In the case of a configuration in which multiple movable portions are held by the same support frame, the distance between adjacent mirrors is reduced, that is, the integration rate can be increased.

Reducing the number of drive units also enables a reduction in the size of an optical deflector incorporating the movable device according to the embodiment. In addition, since the number of drive units and sensors is reduced in the optical deflector according to the present embodiment, the number of electric signal lines can be reduced. This enables a reduction in cost due to a reduction in the size of the circuit board and a reduction in the number of components and a reduction in the size of the entire system. In addition, more compact system and a higher degree of freedom of the optical system are achieved with a higher integration rate in the case of arranging multiple optical elements.

Further, with a reduction in the number of locations at which the mirror is restrained, the driving sensitivity is increased, and a higher angle of view is obtained. Thus, a mirror diameter is increased.

An image projection apparatus incorporating an optical deflector achieves a larger angle of view. In addition, since the mirror is supported at two points and can be easily driven, the number of drive lines and detection lines is reduced, and the number of circuit components is reduced, so that the cost of the system can be reduced. In addition, since the driving sensitivity is increased, and the component cost is reduced, the cost of the system can be reduced.

Figure 21:
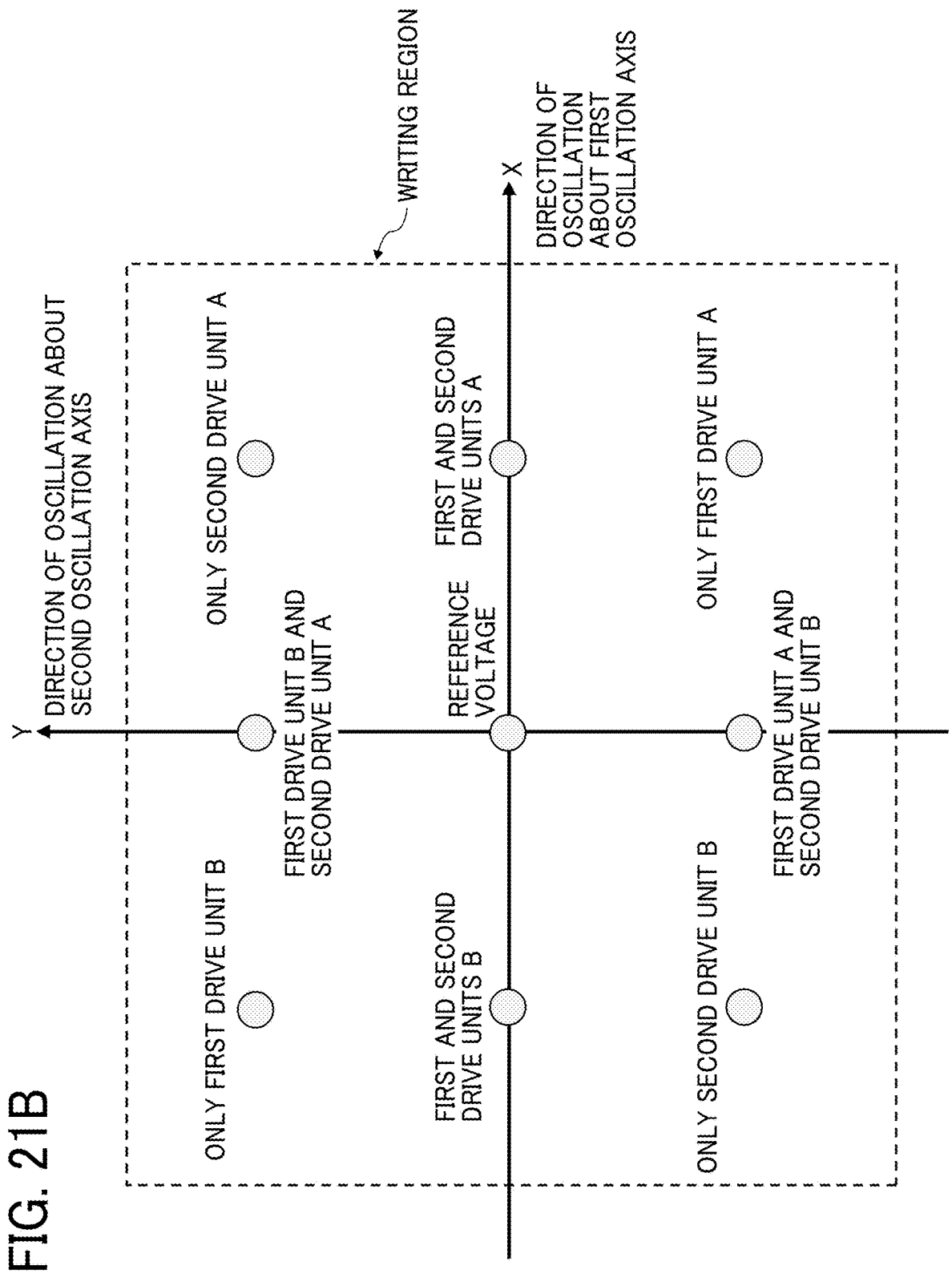
FIG. 21A is a table of deflection-angle directions for applied direct current (DC) voltage, according to a twelfth modification.
FIG. 21B is a graph of deflection-angle positions.

FIGS. 21A and 21B are diagrams of the deflection angles of the movable portion 101 when direct current (DC) voltage V is applied to a drive unit. The DC driving is an example of the vector scan, which is a method that involves changing the center voltage with the amplitude set to 0 the vector scan.

FIG. 21A is a table of combinations of deflection-angle directions and voltages V applied to the first drive unit and the second drive unit for rotation. FIG. 21B is a graph of the deflection-angle direction of the movable portion 101 for each rotation state. The X-direction is a direction in which the movable portion 101 rotates about the third rotation axis 3, and the Y-direction is a direction in which the movable portion 101 rotates about the fourth rotation axis 4. In FIGS. 21A and 21B, the rotation direction when the first drive unit and the second drive unit are driven is a positive direction (+), but is not limited to the example of the embodiment, and may be defined in the opposite direction. In the oblique direction with respect to XY, it is possible to uniformly draw up to the deflection angle position by applying a double voltage.

Although the applied voltage described in FIG. 21A is based on a constant value V, the applied voltage is not limited to the example of the embodiment, and different values may be given. Thus, complicated deflection angle control can be performed. In addition, in a drive unit including one or more beams, the deflection angle can be controlled in the positive direction and the negative direction by setting the reference voltage of the applied voltage signal for rotating the first drive unit and the second drive unit, that is, the applied voltage for the deflection angle of 0 degree, to the central values between maximum voltage values at which the movable portion rotates at a maximum amplitude.

In some embodiments, the first driver of the first member has a first meandering structure in which first multiple beams are joined to turn, and the second driver of the second member has a second meandering structure in which second multiple beams are joined to turn. In the first driver, a piezoelectric driver 113a of a first drive unit A (or a first group of piezoelectric drivers) and a piezoelectric driver 113b of a first drive unit B (or a second group of piezoelectric drivers) are alternately arranged on the +Z-surface of the first multiple beams. In the second driver, a piezoelectric driver 114a of a second drive unit A (or the first group of piezoelectric drivers) and a piezoelectric driver 114b of a second drive unit B (or the second group of piezoelectric drivers) are alternately arranged on the +Z-surface of the second multiple beams. In such a configuration, the deflection angle of the mirror can be controlled in a positive direction or a negative direction without using negative voltage by driving the first drive unit A and the second drive unit A alone or driving the first drive unit B and the second drive unit B alone. Although the first group of piezoelectric drivers and the second group of piezoelectric drivers are distinguished from each other in the above description, these terms are collectively referred to as a piezoelectric drive unit or a drive unit in the present disclosure.

The reference voltage may be a 0 V or any voltage within the maximum amplitude that is produced by an applicable voltage. The reference voltage may differ between the first drive unit and the second drive unit. Alternatively, the reference voltage may differ between the first group of piezoelectric drivers (the piezoelectric drivers 113a and 114a) and the second group of piezoelectric drivers (the piezoelectric drivers 113b and 114b) when these piezoelectric drivers 113a, 114a, 113b, and 114b are included in the movable device. The signal waveform of the applied voltage is not limited to the embodiments, and may be a periodic waveform such as a sine wave, a rectangular wave, or a sawtooth wave, or may be a more complicated periodic waveform. The applied voltage may be a direct current (DC) drive voltage. The Lissajous scan may be performed by bringing the frequency of the drive waveform close to the resonance frequency unique to the structure.

When voltages of opposite phases are applied to the first group of piezoelectric drivers (the piezoelectric drivers 113a and 114a) and the second group of piezoelectric drivers (the piezoelectric drivers 113b and 114b) to switch the applied signals in the voltage or time domain, a time difference may be given to the switching of the signals between the first group of piezoelectric drivers (the piezoelectric drivers 113a and 114a) and the second group of piezoelectric drivers (the piezoelectric drivers 113b and 114b) to cause the generated mechanical vibrations to be opposite in phase between the first group of piezoelectric drivers (the piezoelectric drivers 113a and 114a) and the second group of piezoelectric drivers (the piezoelectric drivers 113b and 114b) and cancel out the mechanical vibrations in the first group of piezoelectric drivers and the second group of piezoelectric drivers. This enables high-speed drawing and response to a complicated driving waveform. The driving method of the drive body (the drive units) is not limited to piezoelectric driving. It may be an electrostatic drive, an electromagnetic drive or a thermoelectric drive.

Hereinafter, embodiments incorporating the movable device according to an embodiment of the present disclosure are described in detail.

Optical Scanning System

An optical scanning system to which the movable device according to the present embodiment is applied will be described in detail with reference to FIGS. 22 to 25.

Figure 22:
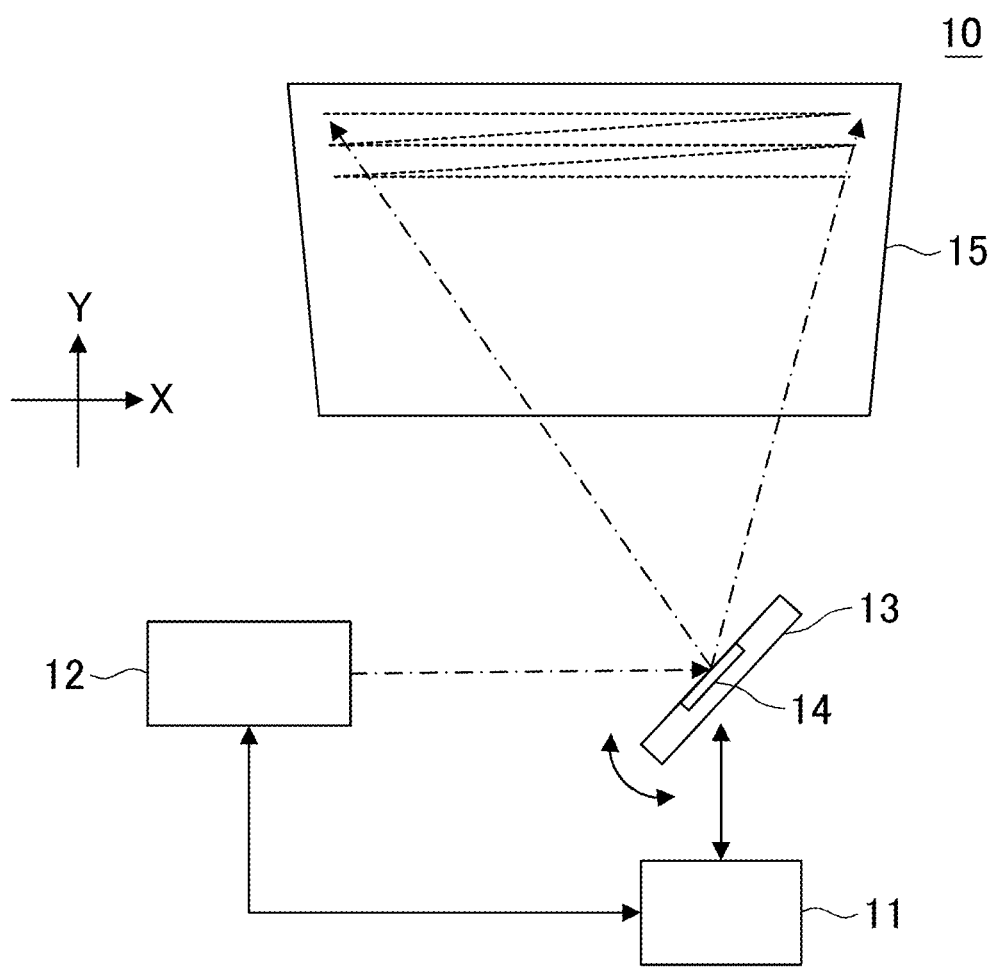
FIG. 22 is a schematic view of an example of an optical scanning system.

FIG. 22 is a schematic view of an example of an optical scanning system 10. As illustrated in FIG. 22, the optical scanning system 10 deflects light emitted from a light-source device 12 under the control of a control device 11, by using a reflecting surface 14 included in the movable device 13, so as to optically scan a target surface 15 to be scanned (hereinafter, referred to as target surface).

The optical scanning system 10 includes the control device 11, the light-source device 12, and the movable device 13 including the reflecting surface 14.

For example, the control device 11 is an electronic circuit unit provided with a central processing unit (CPU) and a field-programmable gate array (FPGA). For example, the movable device 13 is provided with a reflecting surface 14, and the movable device 13 serves as a micro-electromechanical system (MEMS) that is capable of moving the reflecting surface 14. The light-source device 12 is, for example, a laser device that emits a laser beam. The target surface 15 is, for example, a screen.

The control device 11 generates control instructions of the light-source device 12 and the movable device 13 based on acquired optical-scanning information, and outputs drive signals to the light-source device 12 and the movable device 13 based on the control instructions.

The light-source device 12 emits light based on the received drive signal. The movable device 13 moves the reflecting surface 14 in at least one of a uniaxial direction and a biaxial direction, based on the received drive signal.

With this configuration, for example, the reflecting surface 14 of the movable device 13 is biaxially moved in a reciprocating manner within a predetermined range, and the light emitted from the light-source device 12 to be incident on the reflecting surface 14 is uniaxially deflected to perform optical scanning, under the control of the control device 11, which is based on image data that is an example of the optical-scanning information. Accordingly, an image can be projected onto the target surface 15 as desired. The details of the movable device of the present embodiment and the details of the control by the control device are described later.

Figure 23:
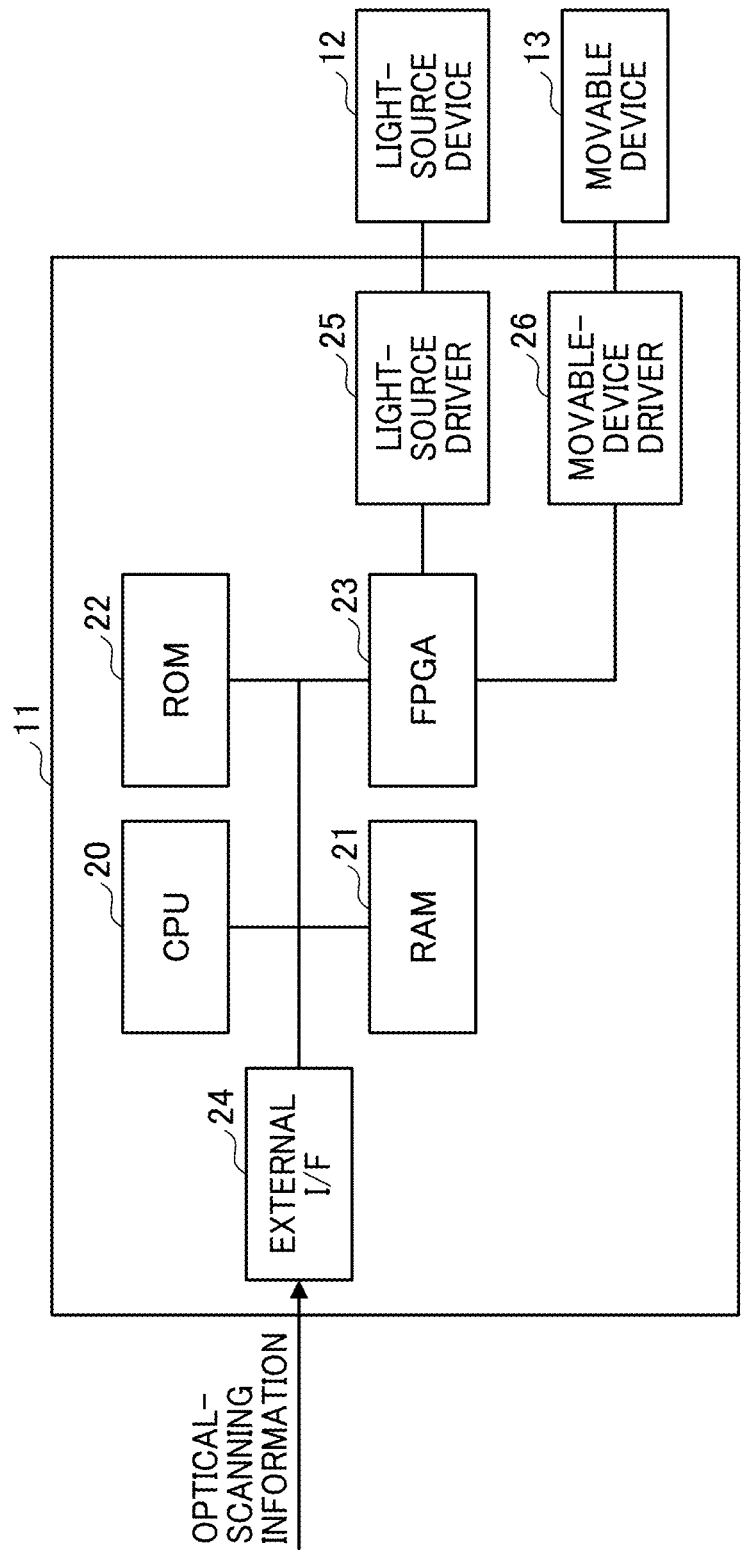
FIG. 23 is a block diagram of the hardware configuration of the optical scanning system.

Next, the hardware configuration of an example of the optical scanning system 10 is described referring to FIG. 23.

As illustrated in FIG. 23, the optical scanning system 10 includes the control device 11, the light-source device 12, and the movable device 13, which are electrically connected to one another. The control device 11 includes a central processing unit (CPU) 20, a random access memory (RAM) 21, a read only memory (ROM) 22, a field-programmable gate array (FPGA) 23, an external interface (I/F) 24, a light-source driver 25, and a movable-device driver 26.

The CPU 20 is an arithmetic device that loads into the RAM 21 a program or data from a storage device such as the ROM 22 and executes processing to provide the controls or functions of the entirety of the control device 11.

The RAM 21 is a volatile storage device that temporarily holds a program and data.

The ROM 22 is a non-volatile storage device that can hold a program and data even after the power is turned off, and stores a program and data for processing that is executed by the CPU 20 to control each function of the optical scanning system 10.

The FPGA 23 is a circuit that outputs proper control signals to the light-source driver 25 and the movable-device driver 26 in accordance with the processing performed by the CPU 20.

For example, the external I/F 24 is an interface with respect to an external device or a network. The external device may be, for example, a host device such as a personal computer (PC); or a storage device, such as a universal serial bus (USB) memory, a secure digital (SD) card, a compact disk (CD), a digital versatile disk (DVD), a hard disk drive (HDD), or a solid state drive (SSD). For example, the network may be a controller area network (CAN) of a vehicle, a local area network (LAN), and the Internet. The external I/F 24 can have any configuration that can achieve connection to an external device or communication with an external device. The external/F 24 may be provided for each external device.

The light-source driver 25 is an electric circuit that outputs a drive signal such as a drive voltage to the light-source device 12 in accordance with the received control signal.

The movable-device driver 26 is an electric circuit that outputs a drive signal such as a drive voltage to the movable device 13 in accordance with the received control signal.

In the control device 11, the CPU 20 acquires optical-scanning information from an external device or a network through the external I/F 24. As far as the CPU 20 can acquire the optical-scanning information, the optical-scanning information may be stored in the ROM 22 or the FPGA 23 in the control device 11. Alternatively, a storage device such as an SSD may be additionally provided in the control device 11 and the optical-scanning information may be stored in the storage device.

In this case, the optical-scanning information indicates how the surface 15 is to be optically scanned. In another example, the optical-scanning information is image data used for optical scanning to display an image. For another example, the optical-scanning information is writing data indicating the order and portion of writing when optical writing is performed by optical scanning. Furthermore, for example, the optical scanning information is irradiation data indicating the timing and range of irradiation of light for object recognition in a case where an object is to be recognized by optical scanning.

The control device 11 can provide the functional configuration described below by using instructions from the CPU 20 and the hardware configuration illustrated in FIG. 23.

Figure 24:
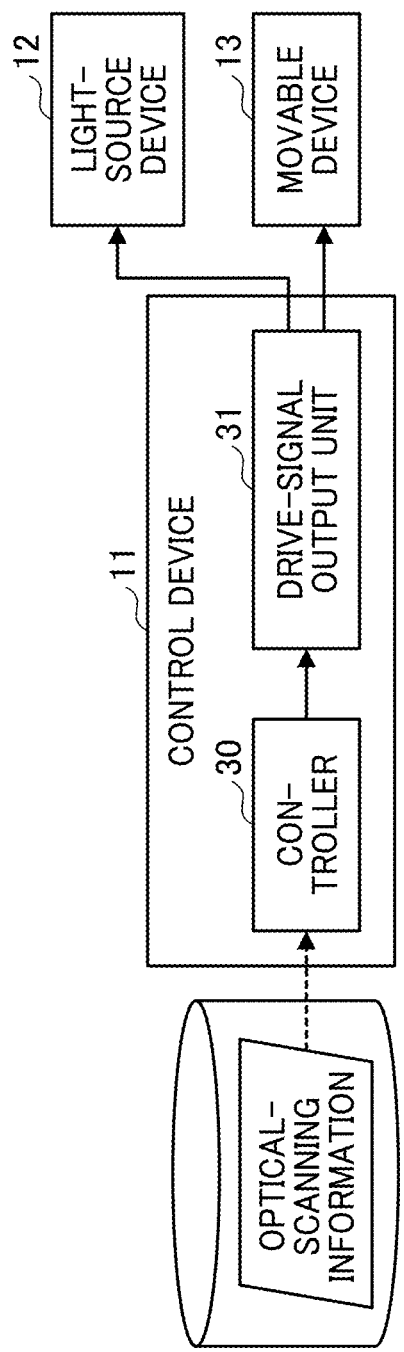
FIG. 24 is a block diagram of the functional configuration of control device according to an embodiment of the present disclosure.

The functional configuration of the control device 11 of the optical scanning system 10 is described below referring to FIG. 24. FIG. 24 is a functional block diagram of an example of the control device 11 of the optical scanning system 10.

As illustrated in FIG. 22, the control device 11 includes a controller 30 and a drive-signal output unit 31 as functions.

The controller 30 is implemented by, for example, the CPU 20 and the FPGA 23. The controller 30 acquires optical-scanning information from an external device, converts the optical-scanning information into a control signal, and outputs the control signal to the drive-signal output unit 31. For example, the controller 30 acquires image data serving as the optical-scanning information from an external device or the like, generates a control signal from the image data through predetermined processing, and outputs the control signal to the drive-signal output unit 31. The drive-signal output unit 31 is implemented by, for example, the light-source driver 25 and the movable-device driver 26. The drive-signal output unit 31 outputs a drive signal to the light-source device 12 or the movable device 13 in accordance with the received control signal.

The drive signal is a signal for controlling the driving of the light-source device 12 or the movable device 13. For example, the drive signal of the light-source device 12 is a drive voltage used to control the irradiation timing and irradiation intensity of the light source. Moreover, for example, the drive signal of the movable device 13 is a drive voltage used to control the timing at which the reflecting surface 14 included in the movable device 13 is moved and the movable range of the reflecting surface 14.

Figure 25:
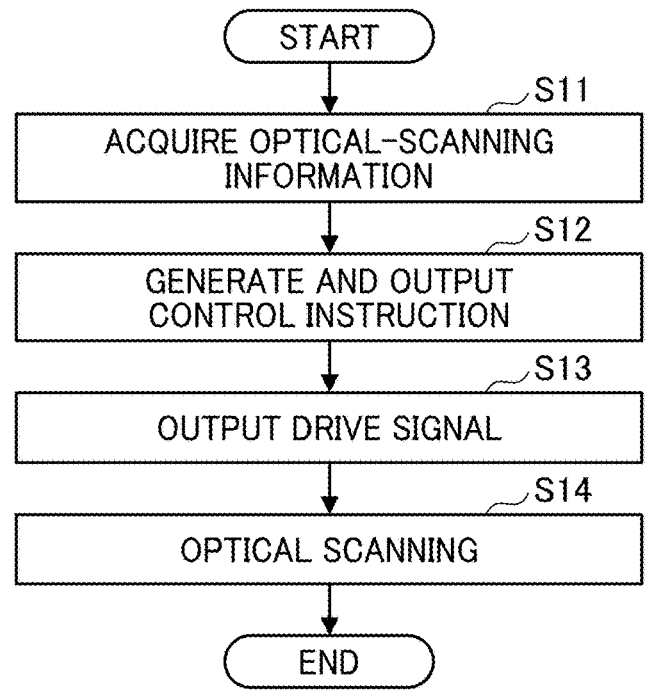
FIG. 25 is a flowchart of processing involved in the optical scanning system, according to an embodiment of the present disclosure.

Next, the process of optically scanning the target surface 15 performed by the optical scanning system 10 is described referring to FIG. 25. FIG. 25 is a flowchart of an example of processing performed by the optical scanning system 10.

In step S11, the controller 30 acquires optical-scanning information from, for example, an external device.

In step S12, the controller 30 generates control signals from the acquired optical-scanning information, and outputs the control signals to the drive-signal output unit 31.

In step S13, the drive-signal output unit 31 outputs drive signals to the light-source device 12 and the movable device 13 based on the received control signals.

In step S14, the light-source device 12 emits light based on the received drive signal. In addition, the movable device 13 moves the reflecting surface 14 based on the received drive signal. The driving of the light-source device 12 and the movable device 13 causes light to be deflected in a given direction, and optical scanning is performed.

In the above-described optical scanning system 10, a single control device 11 has a device and a function for controlling the light-source device 12 and the movable device 13. However, a control device for the light-source device and a control device for the movable device may be separate elements.

In the above-described optical scanning system 10, a single control device 11 has the functions of the controller 30 and the functions of the drive-signal output unit 31 for the light-source device 12 and the movable device 13. These functions may be implemented by separate elements. For example, a drive-signal output device including a drive-signal output unit 31 may be provided in addition to the control device 11 including the controller 30.

An optical deflection system that performs optical deflection may be configured by the control device 11 and the movable device 13 provided with the reflecting surface 14, which are elements of the above optical scanning system 10.

Image Projection Apparatus

An image projection apparatus incorporating a movable device according to at least one embodiment is described in detail with reference to FIGS. 26 and 27.

Figure 26:
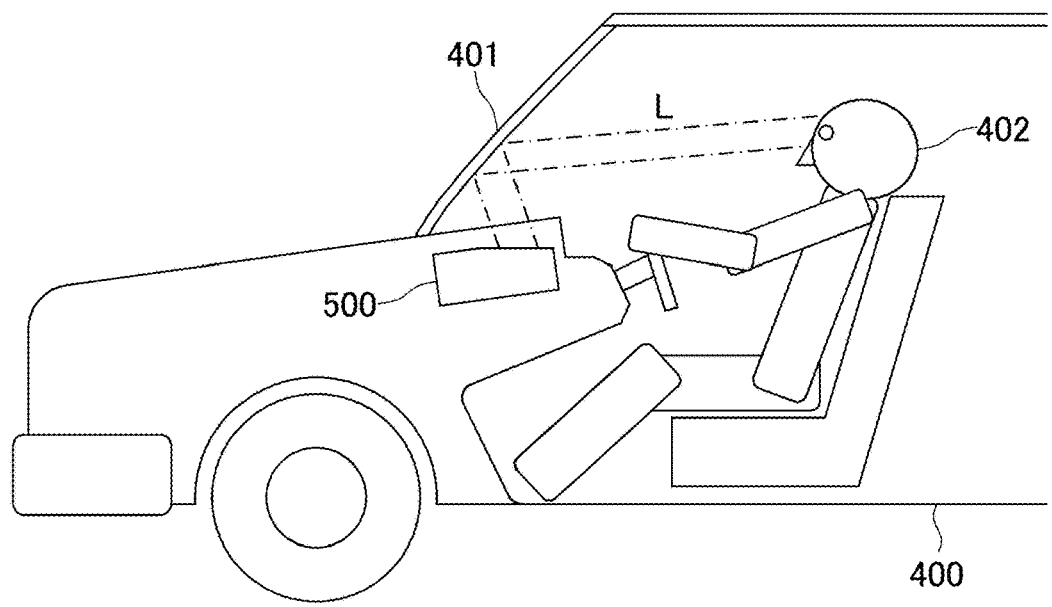
FIG. 26 is a schematic view of an example of a vehicle equipped with a head-up display device (HUD)

FIG. 26 is a schematic view of a vehicle 400 equipped with a head-up display (HUD) 500 as an example of an image projection apparatus, or a projection apparatus according to the embodiment. FIG. 25 is a schematic view of an example of the HUD 500.

The image projection apparatus is an apparatus that projects an image by optical scanning, and is, for example, a HUD.

As illustrated in FIG. 26, for example, the HUD 500 is disposed, for example, near a windshield 401 of the vehicle 400. Projection light L that is emitted from the HUD 500 is reflected by the windshield 401 and directed to a viewer (a driver 402) as a user.

Accordingly, the driver 402 can visually recognize an image or the like projected by the HUD 500, as a virtual image.

Alternatively, a combiner may be disposed on the inner wall surface of the windshield 401 so that the user can visually recognize a virtual image formed by the projection light that is reflected by the combiner.

Figure 27:
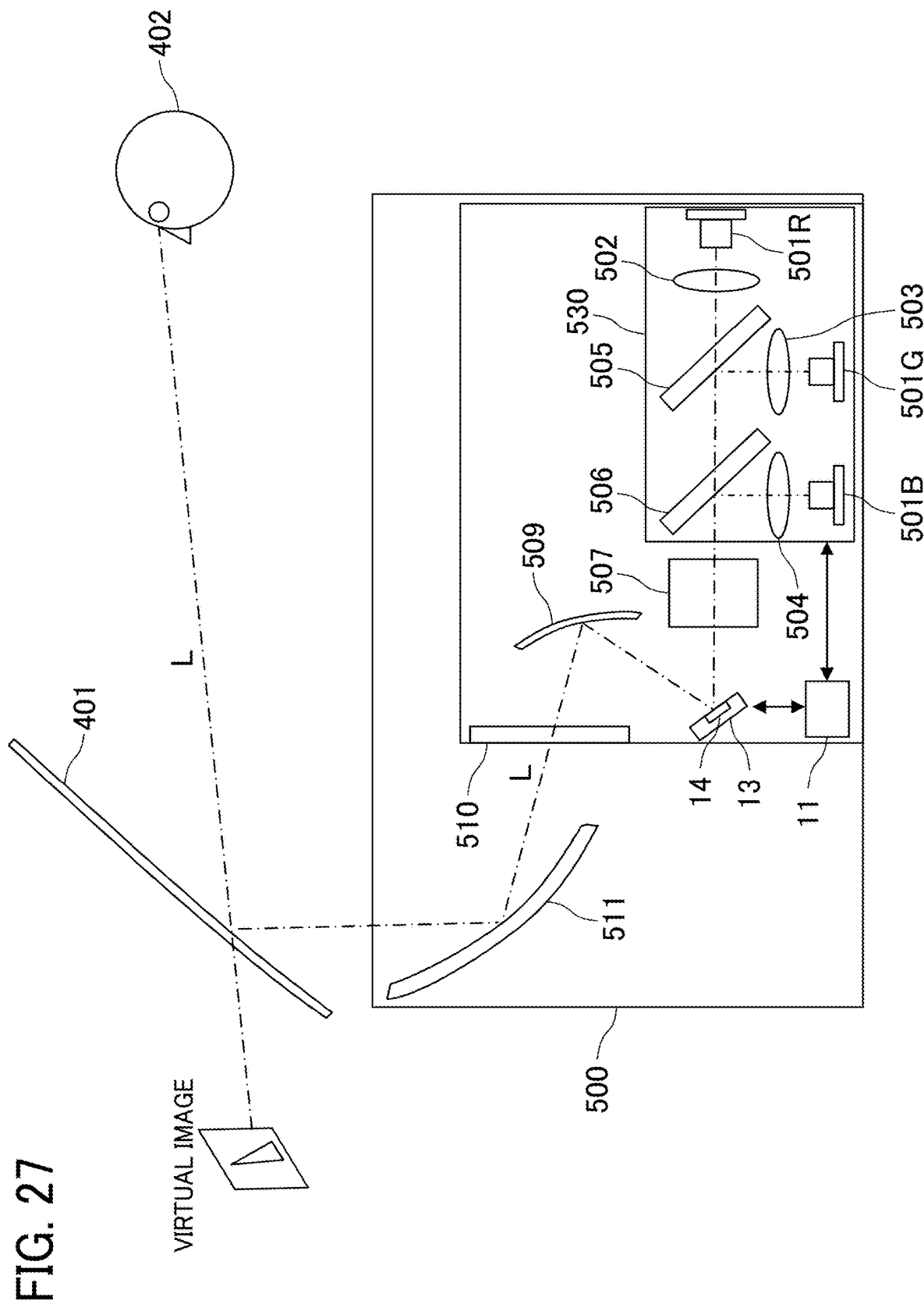
FIG. 27 is a schematic view of a HUD according to an embodiment of the present disclosure.

As illustrated in FIG. 27, the HUD 500 emits laser beams having different wavelengths from red, green, and blue laser-beam sources 501R, 501G, and 501B (multiple light sources of a light source unit of the HUD 500), respectively. The emitted laser beams pass through an incident optical system, and then are deflected by the movable device 13 including the reflecting surface 14. The incidence optical system includes collimator lenses 502, 503, and 504 respectively provided for the laser-beam sources 501R, 501G, and 501B, two dichroic mirrors 505 and 506, and a light-intensity adjuster 507.

The deflected laser beams pass through a projection optical system and are projected onto a screen. The projection optical system (an optical system, of the image projection apparatus) includes a free-form surface mirror 509, an intermediate screen 510, and a projection mirror 511. In the HUD 500, the laser-beam sources 501R, 501G, 501B, the collimator lenses 502, 503, 504, and the dichroic mirrors 505, 506 are combined as a single unit that is an optical housing serving as a light source unit 530 (a light source unit of the HUD 500).

The HUD 500 projects an intermediate image displayed on the intermediate screen 510 onto the windshield 401 of the vehicle 400 to allow the driver 402 to visually recognize the intermediate image as a virtual image.

The laser beams of the RGB colors emitted from the laser beam sources 201R, 201G, and 201B are approximately collimated by the collimator lenses 202, 203, and 204, and are combined by the two dichroic mirrors 205 and 206. The light intensity of the combined laser beams is adjusted by the light-intensity adjuster 507, before being deflected for two-dimensionally scanning by the movable device 13 including the reflecting surface 14.

The light L being deflected for two-dimensional scanning by the movable device 13 is reflected by the free-form surface mirror 509 and has its distortion corrected, thus being condensed on the intermediate screen 510. The intermediate screen 510 includes a microlens array in which microlenses are two-dimensionally arranged, and enlarges the projection light L incident on the intermediate screen 510 in units of microlens.

The movable device 13 causes the reflecting surface 14 to biaxially reciprocate and two-dimensionally scan with the light L incident on the reflecting surface 14. The movable device 13 is controlled in synchronization with the light-emitting timing of the laser sources 501R, 501G, and 501B.

The HUD 500 is described above as an example of the image projection apparatus. However, no limitation is indicated thereby, and the image projection apparatus may be any apparatus that performs optical scanning, using the movable device 13 including the reflecting surface 14, to project an image.

For example, the present disclosure is also applicable to a projector that is placed on a desk or the like and projects an image on a display screen, a head-mounted display device that is incorporated in a wearable member on the head of the observer, for example, and that projects an image on a reflective-and-transmissive screen of the wearable member or on an eyeball as a screen, and the like.

The image projection apparatus may be incorporated in, not only the vehicle or the wearable member, but also, for example, a mobile body such as an aircraft, a ship, or a mobile robot; or an immobile body such as an operation robot that operates a driving target such as a manipulator without moving from the installed location.

The HUD 500 is an example of the "head-up display" described in the claims. The vehicle 400 is an example of the "vehicle" recited in the claims.

Optical Writing Device

Next, an optical writing device to which the movable device 13 according to an embodiment of the present disclosure is applied is described in detail with reference to FIGS. 28 and 29.

Figure 28:
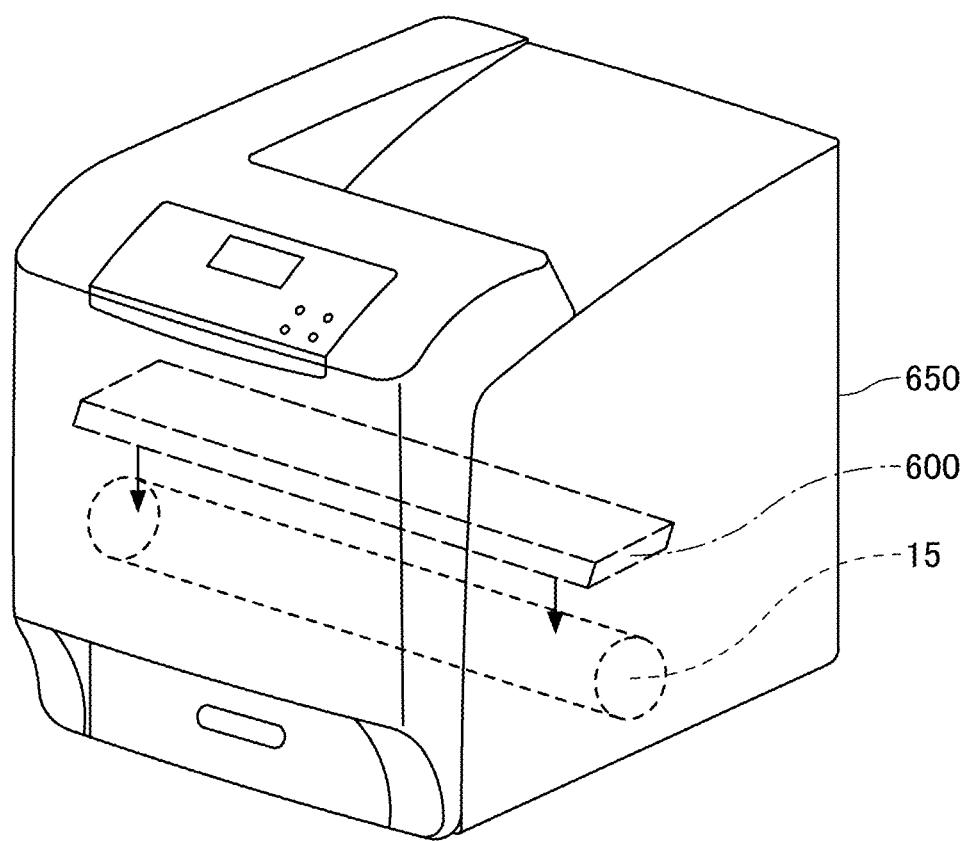
FIG. 28 is a schematic view of an example of an image forming apparatus equipped with an optical writing device.

FIG. 28 illustrates an example of an image forming apparatus equipped with an optical writing device 600. FIG. 29 is a schematic view of an example of the optical writing device 600.

As illustrated in FIG. 28, the optical writing device 600 is used as a component of an image forming apparatus typified by a laser printer 650, for example, having printer functions using laser beams. In the image forming apparatus, the optical writing device 600 performs optical scanning on a photoconductor drum, which is the target surface 15, by using one or more laser beams, thereby performing optical writing on the photoconductor drum.

Figure 29:
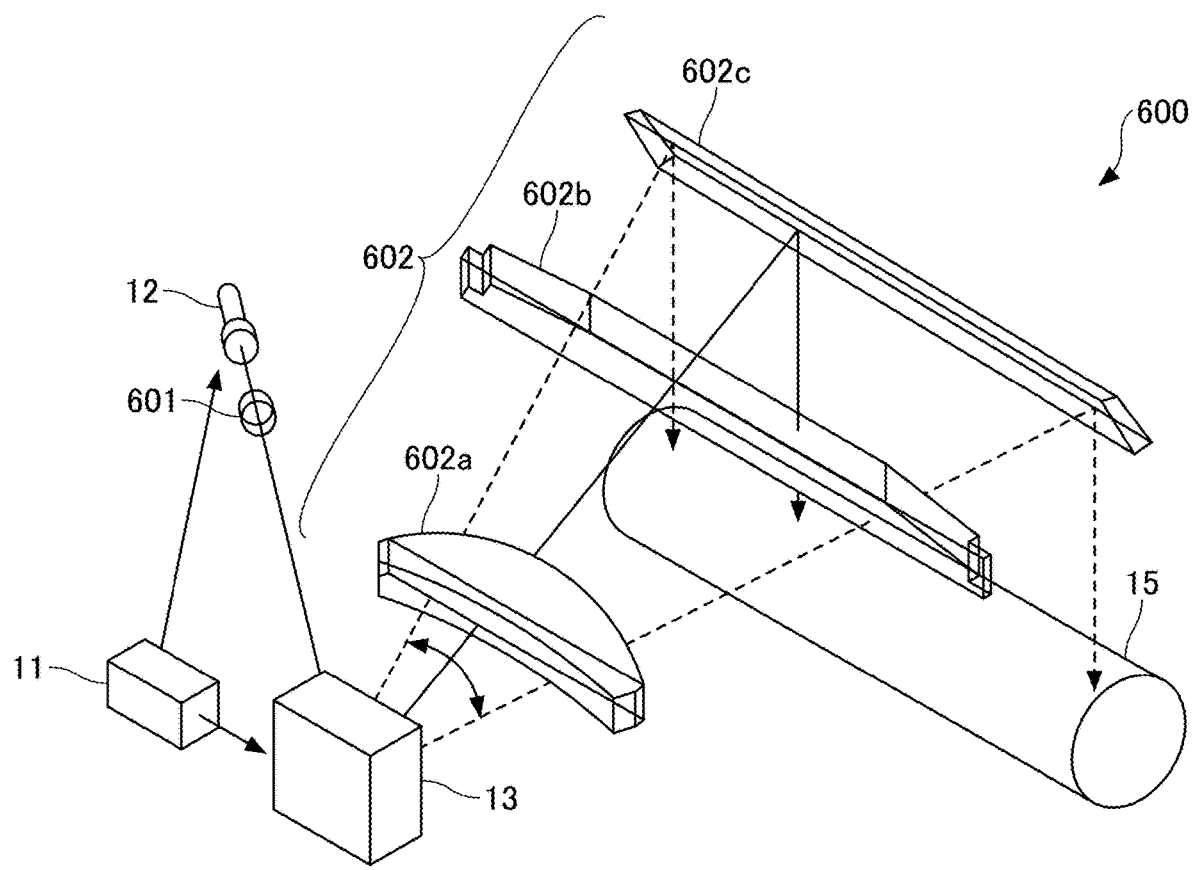
FIG. 29 is a schematic view of an example of the optical writing device.

As illustrated in FIG. 29, in the optical writing device 600, a laser beam from the light-source device 12 such as a laser element passes through an image forming optical system 601 such as a collimator lens and is then deflected uniaxially or biaxially by the movable device 13 having the reflecting surface 14.

The laser beam deflected by the movable device 13 then passes through a scanning optical system 602 including a first lens 602a, a second lens 602b, and a reflecting mirror 602c, and is emitted onto the target surface 15 (for example, a photoconductor drum or photosensitive paper), and thereby optical writing is performed. The scanning optical system 602 forms a laser beam in the form of a spot on the target surface 15. The light-source device 12 and the movable device 13 including the reflecting surface 14 are driven based on the control of the control device 11.

As described above, the optical writing device 600 can be used as a component of the image forming apparatus having a printer function using laser beams. Moreover, by employing another scanning optical system to perform scanning in a biaxial manner in addition to the uniaxial manner, the optical writing device 600 can also be used as a component of an image forming apparatus such as a laser label apparatus that deflects laser beams to perform optical scanning on thermal media and print letters by heating.

The movable device 13 including the reflecting surface 14 to be applied to the optical writing device is advantageous in saving power of the optical writing device because power consumption for driving the movable device 13 is less than that for driving a rotational polygon mirror or the like.

The movable device 13 makes a smaller wind noise when the mirror substrate oscillates compared with a rotational polygon mirror, and thus is advantageous in achieving low noise of the optical writing device. The optical writing device requires much smaller installation space than the installation space of a rotational polygon mirror, and the amount of heat generated by the movable device 13 is small. Accordingly, downsizing is easily achieved, and thus the optical writing device is advantageous in downsizing the image forming apparatus.

Object Recognition Apparatus

An object recognition apparatus to which the movable device 13 according to an embodiment of the present disclosure is applied is described in detail with reference to FIGS. 30 and 33.

Figure 30:
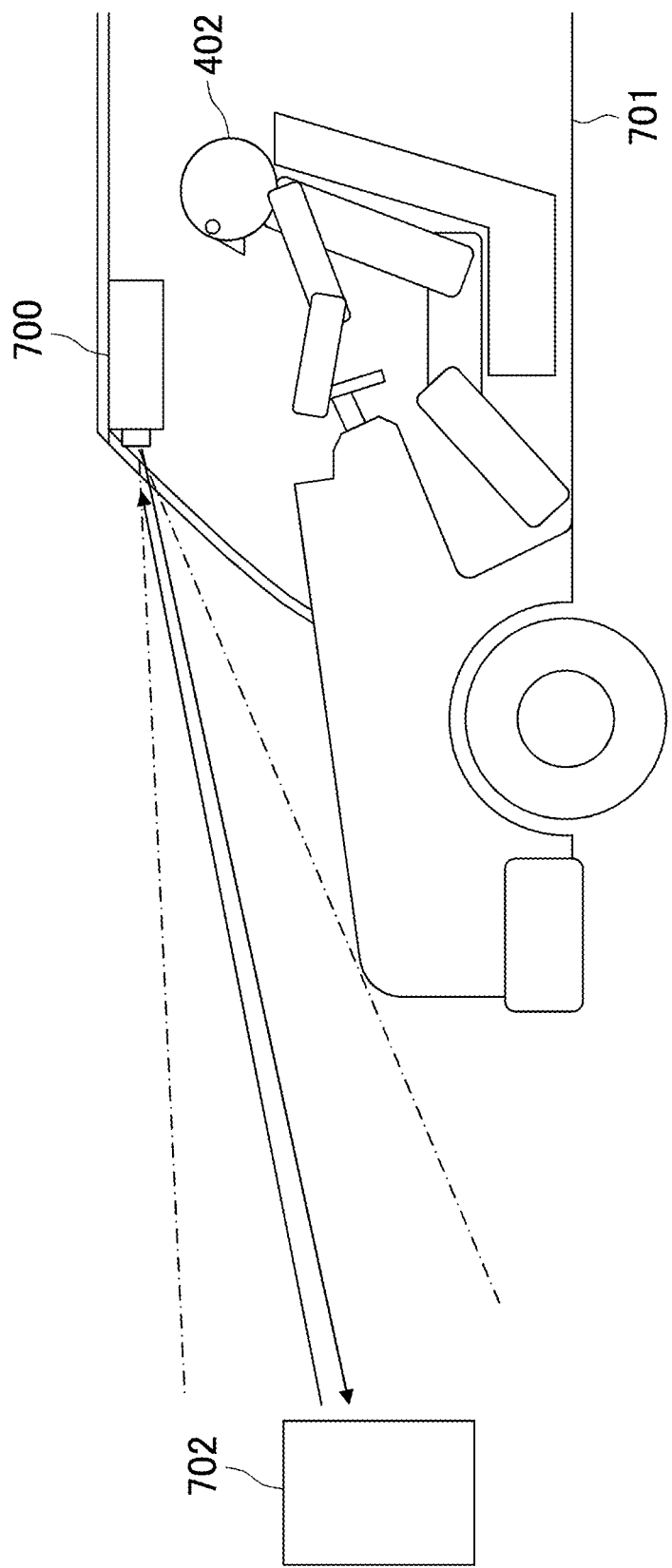
FIG. 30 is a schematic view of a vehicle equipped with a laser imaging detection and ranging (LiDAR) device, according to an embodiment of the present disclosure.

FIG. 30 is a schematic diagram of a vehicle provided with a LiDAR device that serves as an object recognition apparatus according to an embodiment of the present disclosure. FIG. 30 is a schematic view of a vehicle mounted with a LiDAR device in a lamp unit on which a headlamp of the vehicle is mounted.

Figure 31:
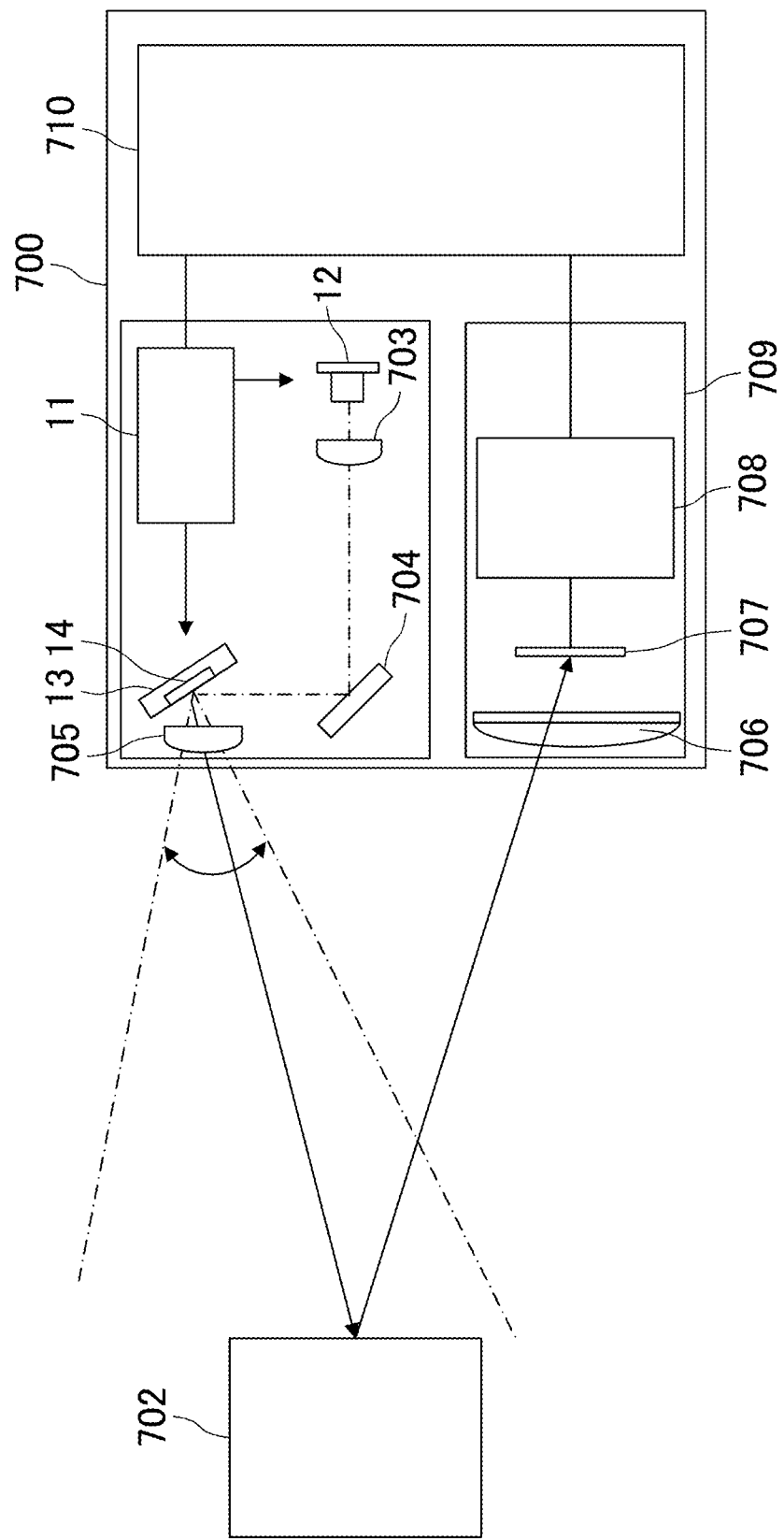
FIG. 31 is a schematic illustration of the LiDAR device.

FIG. 31 is a schematic view of an example of the LiDAR device.

The object recognition apparatus is an apparatus that recognizes an object in a target direction, and is, for example, a LiDAR device.

As illustrated in FIG. 30, for example, a LiDAR device 700 is mounted on a vehicle 701 to perform optical scanning in a target direction and receive the light reflected from an object 702 that exists in the target direction. Accordingly, the object 702 can be recognized by the LiDAR device 700.

As illustrated in FIG. 31, the laser beams emitted from a light-source device 12 pass through an incidence optical system, and then are caused to perform scanning uniaxially or biaxially using the movable device 13 including the reflecting surface 14. The incidence optical system includes a collimator lens 703 that serves as an optical system that collimates divergent beams into approximately parallel beams, and a planar mirror 704.

The parallel beams are emitted to the object 702 ahead of the device, as passing through, for example, a projection lens 705 that serves as a projection optical system. The driving of the light-source device 12 and the movable device 13 is controlled by the control device 11. The light reflected by the object 702 is detected by a photodetector 709.

More specifically, the reflected light passes through, for example, a condenser lens 706 that serves as an incident-light receiving and detecting optical system, and is received by an image sensor 707. Then, the image sensor 707 outputs a detected signal to a signal processing circuit 708. The signal processing circuit 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 12 emits laser beams and the timing at which the photodetector 709 receives the laser beams or the phase difference per pixel of the image sensor 707 that have received the laser beams. Moreover, the distance measuring circuit 710 calculates distance information indicating the distance from the object 702.

The movable device 13 including the reflecting surface 14 is less likely broken and is compact compared with a polygon mirror, and thus, a highly durable and compact LiDAR device can be provided. Such a LiDAR device is attached to, for example, a vehicle, an aircraft, a ship, a robot, or the like, and can perform optical scanning within a predetermined range to determine whether an obstacle is present or to recognize the distance to the obstacle.

In the present embodiment, the LiDAR device 700 is described as an example of the object recognition apparatus. However, no limitation is intended thereby. The object recognition apparatus may be any apparatus that performs optical scanning by controlling the movable device 13 provided with the reflecting surface 14, using the control device 11, and that receives the receives the reflected laser beam using a photodetector to recognize the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

Laser Head Lamp

Figure 32:
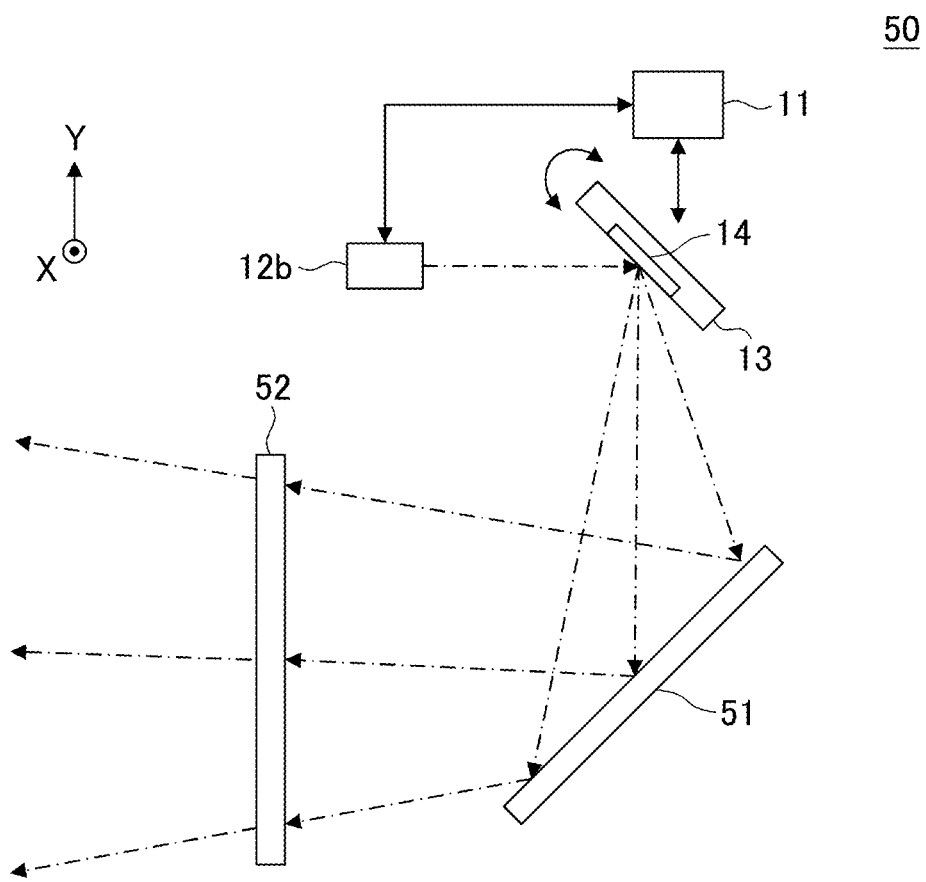
FIG. 32 is a schematic view of an example of a configuration of a laser headlamp.

Next, a laser headlamp 50 in which the movable device of the embodiment is applied to a headlight of a vehicle is described referring to FIG. 32. FIG. 32 is a schematic view of an example of a configuration of the laser headlamp 50.

The laser headlamp 50 includes a control device 11, a light-source device 12*b*, a movable device 13 including a reflecting surface 14, a mirror 51, and a transparent plate 52.

The light-source device 12*b* is a light source that emits blue laser beams. The laser beams emitted from the light-source device 12*b* are incident on the movable device 13 and are reflected by the reflecting surface 14. The movable device 13 moves the reflecting surface 14 in the XY-direction based on the signal from the control device 11, and performs two-dimensional scanning using blue laser beams emitted from the light-source device 12*b* in the XY-direction.

The scanning light of the movable device 13 is reflected by the mirror 51, and is incident on the transparent plate 52. The transparent plate 52 is coated with a yellow phosphor on the front surface or the back surface. The blue laser beams that are reflected by the mirror 51 are converted into white light whose color is within the range of the statutory color for a headlight as passing through the yellow phosphor (fluorescent material) of the transparent plate 52. Thereby, the front of the vehicle is illuminated with white light from the transparent plate 52.

The scanning light of the movable device 13 scatters in a predetermined manner as passing through the fluorescent material of the transparent plate 52.

Accordingly, glare is attenuated at an illuminated target in the area ahead of the vehicle.

When the movable device 13 is applied to a headlight of a vehicle, the color of light beams from the light-source device 12*b* and the color of the phosphor are not limited to blue and yellow, respectively. For example, the light-source device 12*b* may emit near-ultraviolet light, and the transparent plate 52 may be coated with homogenized mixture of a plurality of kinds of fluorescent materials of red-green-blue (RGB) trichromatic colors. In this case as well, the light passing through the transparent plate 52 can be converted into white light, and the front of the vehicle can be illuminated with white light.

Head-Mounted Display

Figure 33:
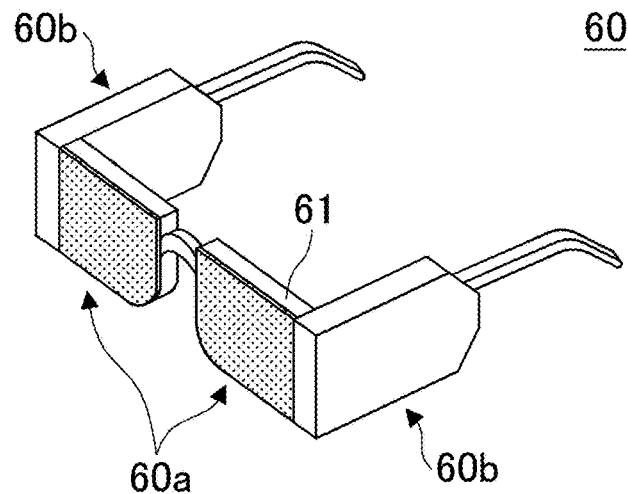
FIG. 33 is a schematic perspective view of an example of a configuration of a head-mounted display (HMD)
Figure 34:
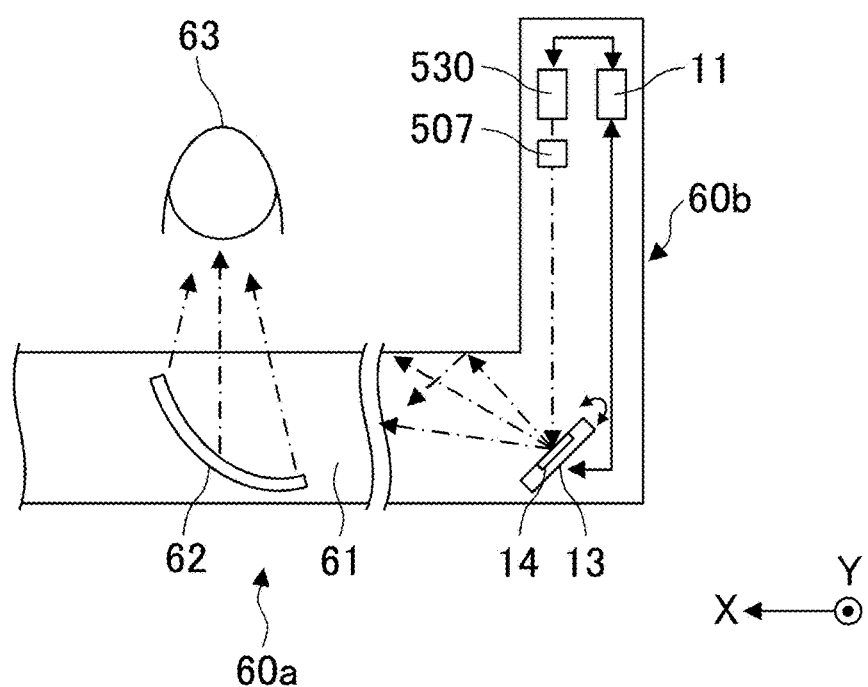
FIG. 34 illustrates an example of a part of a configuration of the HMD.

Next, a head-mounted display (HMD) 60 to which the movable device 13 according to an embodiment is applied is described referring to FIGS. 33 and 34. Note that the HMD 60 is a head-mounted display that can be mounted on a human head, and can be shaped like, for example, glasses. In the following description, such a head-mounted display may be referred to simply as an HMD.

FIG. 33 is a perspective view of the appearance of the HMD 60. In FIG. 34, the HMD 60 includes a pair of a front 60*a* and a temple 60*b* provided substantially symmetrically on each of the left and right. The front parts 60*a* each have a light guide plate 61. An optical system, a controller, and another component are incorporated in the temple 60*b*.

FIG. 34 is an illustration of a configuration of a part of the HMD 60. Although the configuration for the left eye is illustrated in FIG. 34, the HMD 60 has a configuration similar to that for the right eye.

The HMD 60 includes a control device 11, a light source unit 530, a light-intensity adjuster 507, a movable device 13 including a reflecting surface 14, a light guide plate 61, and a semi-reflective mirror 62.

The light source unit 530 includes, as described above, the laser-beam sources 501R, 501G, and 501B, the collimator lenses 502, 503, and 504, and the dichroic mirrors 505 and 506, and these elements are combined as a single unit in the optical housing.

In the light source unit 530, the laser beams of the RGB colors that are emitted from the laser-beam sources 501R, 501G, and 501B are combined by the two dichroic mirrors 505 and 506. The combined parallel light is emitted from the light source unit 530.

The light intensity of the combined laser beams from the light source unit 530 is adjusted by the light-intensity adjuster 507. Then, the adjusted light is incident on the movable device 13. The movable device 13 moves the reflecting surface 14 in the XY-direction based on the signal from the control device 11, and performs two-dimensional scanning with the light emitted from the light source unit 530. The driving of the movable device 13 is controlled in synchronization with the light emission timings of the laser-beam sources 501R, 501G, and 501B, and a color image is formed with the scanning light.

The scanning light by the movable device 13 is incident on the light guide plate 61. The light guide plate 61 reflects the scanning light on the inner wall and guides the scanning light to the semi-reflective mirror 62. The light guide plate 61 is formed from a material such as a resin having transparency at the wavelength of the scanning light.

The semi-reflective mirror 62 reflects the light guided through the light guide plate 61 to the back side of the HMD 60, emitting the light in the direction to an eye of a wearer 63 of the HMD 60. The semi-reflective mirror 62 has, for example, a free-form surface shape. An image formed of the scanning light is reflected by the semi-reflective mirror 62, thus being formed on the retina of wearer 63. Alternatively, the reflection at the semi-reflective mirror 62 and the effect of the crystalline lenses of eyeballs causes the image of the scanning light to be formed on the retina of the wearer 63. Moreover, due to the reflection at the semi-reflective mirror 62, the spatial distortion of the image is corrected. The wearer 63 can observe an image formed by the light of scanning in the XY direction.

The wearer 63 observes an image of external light superposed on the image of the scanning light because of the semi-reflective mirror 62. Alternatively, a mirror may be provided instead of the semi-reflective mirror 62 so that external light is blocked out and the wearer 63 observes only the image of the scanning light.

Aspects of the present invention are as follows.

Aspect 1

In Aspect 1, a movable device (13) according to an embodiment includes: a movable portion (101); a support body (102); a first member (100) having one end (112) coupled to the support body (102) and another end (111) coupled to the movable portion (101); the first member (100) including a first driver (113a, 113b); and a second member (130) having one end (116) coupled to the support body (102) and another end (115) coupled to the movable portion (101), the second member (130) including a second driver (114a, 114b). The movable portion (101) rotates about a first rotation axis (1) by driving the first driver (113a, 113b) and without driving the second driver (114a, 114b). The movable portion rotates about a second rotation axis (2) by driving the second driver (114a, 114b) and without driving the first driver (113a, 113b). The first rotation axis (1) intersects the second rotation axis (2).

This configuration enables the rotation axis of the movable portion 101 to be set in any desired direction when voltage is applied to the first driver and the second driver.

Aspect 2

In Aspect 2, the movable device (13) according to Aspect 1, further includes: a first connecting portion (111) connecting the movable portion (101) with said another end (111) of the first member (111); and a free end portion opposite to the first connecting portion (11) across the first rotation axis (1).

This configuration allows an area at the opposite side of the first rotation axis to serve as a free end and thus enables a wider movable range of the movable portion 101. This achieves a wider movable range of the movable portion 101 that rotates about a rotation axis in a particular direction when voltage is applied to the first drive unit and the second drive unit.

Aspect 3

The movable device (13) according to Aspect 1 or 2, further includes: a second connecting portion (115) connecting the movable portion (101) with said another end of the second member (130); and a free end portion opposite to the second connecting portion (115) across the second rotation axis (2).

This configuration allows an area at the opposite of the first rotation axis to serve as a free end and thus enables a wider movable range of the movable portion 101. The wider movable range of the movable portion 101 increases the number of directions along the rotation axis when voltage is applied to the first drive unit and the second drive unit.

Aspect 4

In the movable device (13) according to Aspect 2 or 3, a first straight line and a second straight line form an angle of 90 degrees or less. The first straight line passes through the first connecting portion (111) and a center of the movable portion (101), and the second straight line passes through the second connecting portion (115) and the center of the movable portion (101).

This configuration increases the movable range of the movable portion 101 that rotates about two rotation axes orthogonal to each other when a voltage is applied to the first drive unit and the second drive unit.

Aspect 5

The movable device (13) according to any one of Aspect 1 to Aspect 4, further including circuitry (a voltage controller, or controller 30) configured to control a first voltage applied to the first driver (113a, 113b) and a second voltage applied to the second driver (114a, 114b). The circuitry (e.g., the voltage controller) is further configured to change a phase difference between a first phase of the first voltage and a second phase of the second voltage.

Such a change in phase difference between the first phase of the voltage applied to the first drive unit and the second phase of the voltage applied to the second drive unit allows a change in the direction of the rotation axis of the movable portion 101 when voltage is applied to the first drive unit and the second drive unit. The voltage controller (or the control device 11) may change the difference between the voltage applied to the first driver and the voltage applied to the second driver or may change a ratio therebetween.

Aspect 6

In the movable device (13) according to any one of Aspect 1 to Aspect 5, the movable portion (101) is rotatable about a third rotation axis (3) and a fourth rotation axis (4) intersecting the third rotation axis (3).

This configuration allows selection of a desired rotation axis irrespective of the positions of the first and second drivers and thus enables two-dimensional rotation of the movable portion 101.

Aspect 7

The movable device (13) according to Aspect 6, further includes circuitry configured to control a first voltage applied to the first driver (113a, 113b) and a second voltage applied to the second driver (114a, 114b), the first voltage having a first phase and the second voltage having a second phase. The movable portion (101) rotates about the third rotation axis (3) by respectively applying the first voltage and the second voltage to the first driver (113a, 113b) and the second driver (114a, 114b), the first phase of which is same with the second phase. The movable portion rotates about the fourth rotation axis (4) by respectively applying the first voltage and the second voltage to the first driver (113a, 113b) and the second driver (114a, 114b), the first phase of which is opposite to the second phase. The third rotation axis (4) is orthogonal to the fourth rotation axis (4) in a plan view of the support body (102).

With this configuration, the movable portion 101 is rotated about the third rotation axis 3 by driving the first driver 100 and the second driver 130 at the same phase. By contrast, the movable portion 101 is rotated about the fourth rotation axis 4 substantially perpendicular to the third rotation axis 3 by driving the first driver 100 and the second driver 130 at the opposite phases.

Aspect 8

The movable device (13) according to Aspect 6 or 7, further includes: a first connecting portion connecting (11) the movable portion (101) with said another end of the first member (113a, 113b); and a second connecting portion (115) connecting the movable portion (101) with said another end of the second member (114a, 114b). A first angle between a first straight line and the third rotation axis is in a range from 35 to 55 degrees, the first straight line passing through the first connecting portion (111) and a center of the movable portion (101). A second angle between a second straight line and the fourth rotation axis is in a range from 35 to 55 degrees, the second straight line passing through the second connecting portion (115) and the center of the movable portion (101).

This configuration optimizes the degree of two-axis operation efficiency and increases two-dimensional deflection angle and its scanning amplitude.

Aspect 9

The movable device (13) according to any one of Aspect 6 to Aspect 8, further includes: a first connecting portion (111) connecting the movable portion (101) with said another end of the first member (113a, 113b); and a second connecting portion (115) connecting the movable portion (101) with said another end of the second member (114a, 114b). A first straight line passing through the first connecting portion (111) and a center of the movable portion (101) is parallel to the third rotation axis (3) or the fourth rotation axis (4). A second straight line passing through the second connecting portion (115) and the center of the movable portion (101) is parallel to the third rotation axis (3) or the fourth rotation axis (4).

This configuration allows any desired design of the connecting portions and control of the center of the rotation of the movable portion. This further allows the center of the mirror to match the center of the rotation of the movable portion, and thus alleviates tolerance of optical design and reduces manufacturing cost.

Aspect 10

In the movable device (13) according to any one of Aspect 1 to Aspect 9, each of the first driver (113a, 113b) and the second driver (114a, 114b) has a beam structure including one or more beams, each having a curved shape concentric with the movable portion having a circular shape.

This configuration having the curved structure allows a smaller chip size, lower matching cost, and a higher amplitude of the rotation of the movable portion 101.

Aspect 11

In the movable device (13) according to any one of Aspect 1 to Aspect 9, each of the first member (100) and the second member (130) has a beam structure including one or more beams, each having a linear shape parallel to at least one side of the movable portion having a parallelogram shape.

This configuration, which allows a linear meandering structure, enables a smaller chip size and lower manufacturing cost.

Aspect 12

In the movable device (13) according to any one of Aspect 6 to Aspect 9, each of the first member (100) and the second member (130) has a beam structure including one or more beams, each extending in a direction inclined relative to each of the third rotation axis and the fourth rotation axis by an angle in a range from 35 to 55 degrees in a plan view of the support body.

This configuration eliminates an unwanted end portion of the movable portion 101 and allows a higher frequency and a higher deflection angle of the movable portion 101.

Aspect 13

In the movable device (13) according to any one of Aspect 1 to Aspect 12, each of the first member (100) and the second member (130) has a meandering structure.

This allows a larger deflection angle of the movable portion. Thus, ringing can be reduced or prevented by the cancellation of the vibration, and higher image quality is achieved.

Aspect 14

In the movable device (13) according to Aspect 8 or 9, a straight line passing through the first connecting portion (111) and the second connecting portion (115) is parallel to the third rotation axis (3) or the fourth rotation axis (4).

This configuration allows the center of the rotation of the mirror (i.e., the reflecting surface 14) to match the center of the movable portion 101 and eliminates a process for adjusting the center of the movement during attachment of optical components.

Aspect 15

In the movable device (13) according to any one of Aspect 6 to Aspect 9, Aspect 12, and Aspect 14, the movable portion (101) includes a substrate, and the substrate is parallel to the third rotation axis (3) or the fourth rotation axis (4), and the substrate is asymmetrical with respect to a straight line passing through a center of the movable portion (101).

This configuration allows adjustment of the position of the center of gravity of the movable portion 101 and thus stabilizes its vibration.

Aspect 16

In the movable device (13) according to any one of Aspect 1 to Aspect 15, the movable portion rotates at a zero-deflection angle by applying a reference voltage to the first driver (113a, 113b) and the second driver (114a, 114b), and the movable portion rotates at the maximum deflection angle by applying the maximum voltage to the first driver (113a, 113b) and the second driver (114a, 114b). The reference voltage is set to a central value of the maximum voltage.

This configuration reduces ringing by canceling the oscillation of the first and second drivers and achieves higher image quality. This configuration also enables oscillation of the movable portion at deflection angles (i.e., a deflection angle of the mirror) in positive and negative directions without application of negative voltage or a bimorph structure, meaning that any of a meandering structure and cantilevered structure may be adopted.

Aspect 17

In the movable device (13) according to any one of Aspect 1 to Aspect 16, further including circuitry configured to control a first voltage applied to the first driver (113a, 113b) and a second voltage applied to the second driver (114a, 114b). Each of a first drive signal of the first voltage and a second drive signal of the second voltage has two channels. The circuitry is further configured to adjust amplitude and phase of each of the two channels of the first voltage and the second voltage to perform vector scan.

This configuration allows a reduction in the chip size and also achieves vector scanning and switching of the deflection angle by applying a desired degree of DC voltage.

Aspect 18

In the movable device (13) according to any one of Aspect 1 to Aspect 16, further including circuitry configured to control a first voltage applied to the first driver (113a, 113b) and a second voltage applied to the second driver (114a, 114b). Each of a first drive signal of the first voltage and a second drive signal of the second voltage has two channels. The circuitry is further configured to adjust amplitude and phase of each of the two channels of the first voltage and the second voltage to perform Lissajous scan.

Thus, the chip size can be reduced and the Lissajous scan can be performed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A movable device comprising:
a movable portion;
a support body;
a first member having one end coupled to the support body and another end coupled to the movable portion; the first member including a first driver; and
a second member having one end coupled to the support body and another end coupled to the movable portion, the second member including a second driver,
wherein the movable portion rotates about a first rotation axis by driving the first driver and without driving the second driver; and
the movable portion rotates about a second rotation axis by driving the second driver and without driving the first driver; and
the first rotation axis intersects the second rotation axis, the movable device further comprising:
a first connecting portion connecting the movable portion with said another end of the first member;
a free end portion opposite to the first connecting portion across the first rotation axis; and
a second connecting portion connecting the movable portion with said another end of the second member, wherein:
a first straight line and a second straight line form an angle of 90 degrees or less,
the first straight line passes through the first connecting portion and a center of the movable portion, and
the second straight line passes through the second connecting portion and the center of the movable portion.

2. The movable device according to claim 1, further comprising:
a free end portion opposite to the second connecting portion across the second rotation axis.

3. The movable device according to claim 1, further comprising:
circuitry configured to control a first voltage applied to the first driver and a second voltage applied to the second driver,
wherein the circuitry is further configured to change a phase difference between a first phase of the first voltage and a second phase of the second voltage.

4. The movable device according to claim 1, wherein:
the movable portion is rotatable about a third rotation axis and a fourth rotation axis intersecting the third rotation axis.

5. The movable device according to claim 4, further comprising:
circuitry configured to control a first voltage applied to the first driver and a second voltage applied to the second driver, the first voltage having a first phase and the second voltage having a second phase,
wherein:
the movable portion rotates about the third rotation axis by respectively applying the first voltage and the second voltage to the first driver and the second driver, the first phase of which is same with the second phase; and the movable portion rotates about the fourth rotation axis by respectively applying the first voltage and the second voltage to the first driver and the second driver, the first phase of which is opposite to the second phase, and
the third rotation axis is orthogonal to the fourth rotation axis in a plan view of the support body.

6. The movable device according to claim 4, wherein:
a first angle between the first straight line and the third rotation axis is in a range from 35 to 55 degrees, and
a second angle between the second straight line and the fourth rotation axis is in a range from 35 to 55 degrees.

7. The movable device according to claim 4, wherein:
the first straight line is parallel to the third rotation axis or the fourth rotation axis, and
the second straight line is parallel to the third rotation axis or the fourth rotation axis.

8. A movable device, comprising:
a movable portion;
a support body;
a first member having one end coupled to the support body and another end coupled to the movable portion; the first member including a first driver; and
a second member having one end coupled to the support body and another end coupled to the movable portion, the second member including a second driver,
wherein the movable portion rotates about a first rotation axis by driving the first driver and without driving the second driver; and
the movable portion rotates about a second rotation axis by driving the second driver and without driving the first driver; and
the first rotation axis intersects the second rotation axis,
wherein each of the first driver and the second driver has a beam structure including one or more beams, each having a curved shape concentric with the movable portion having a circular shape.

9. The movable device according to claim 1, wherein:
each of the first member and the second member has a beam structure including one or more beams, each having a linear shape parallel to at least one side of the movable portion having a parallelogram shape.

10. The movable device according to claim 4, wherein:
each of the first member and the second member has a beam structure including one or more beams, each extending in a direction inclined relative to each of the third rotation axis and the fourth rotation axis by an angle in a range from 35 to 55 degrees in a plan view of the support body.

11. The movable device according to claim 1, wherein:
each of the first member and the second member has a meandering structure.

12. The movable device according to claim 7, wherein:
a straight line passing through the first connecting portion and the second connecting portion is parallel to the third rotation axis or the fourth rotation axis.

13. The movable device according to claim 4, wherein:
the movable portion includes a substrate,
the substrate is parallel to the third rotation axis or the fourth rotation axis, and
the substrate is asymmetrical with respect to a straight line passing through a center of the movable portion.

14. A movable device, comprising:
a movable portion;
a support body;
a first member having one end coupled to the support body and another end coupled to the movable portion; the first member including a first driver; and a second member having one end coupled to the support body and another end coupled to the movable portion, the second member including a second driver, wherein the movable portion rotates about a first rotation axis by driving the first driver and without driving the second driver; and the movable portion rotates about a second rotation axis by driving the second driver and without driving the first driver; and the first rotation axis intersects the second rotation axis, wherein:

the movable portion rotates at a zero-deflection angle by applying a reference voltage to the first driver and the second driver, the movable portion rotates at the maximum deflection angle by applying the maximum voltage to the first driver and the second driver, and the reference voltage is set to a central value of the maximum voltage.

15. The movable device according to claim 1, further comprising:

circuitry configured to control a first voltage applied to the first driver and a second voltage applied to the second driver, wherein:

each of a first drive signal of the first voltage and a second drive signal of the second voltage has two channels, and the circuitry is further configured to adjust amplitude and phase of each of the two channels of the first voltage and the second voltage to perform vector scan.

16. The movable device according to claim 1, further comprising:

circuitry configured to control a first voltage applied to the first driver and a second voltage applied to the second driver, wherein:

each of a first drive signal of the first voltage and a second drive signal of the second voltage has two channels, and the circuitry is further configured to adjust amplitude and phase of each of the two channels of the first voltage and the second voltage to perform Lissajous scan.

17. A projection apparatus comprising:

an optical scanning system configured to optically scan a target surface with light deflected by the movable device according to claim 1.

18. A head-up display comprising the movable device according to claim 1.

* * * * *